US012643484B2

(12) United States Patent
Suzuki

(10) Patent No.: US 12,643,484 B2
(45) Date of Patent: Jun. 2, 2026

(54) GLOVE BOX

(71) Applicant: KOJIMA INDUSTRIES CORPORATION, Toyota (JP)

(72) Inventor: Junya Suzuki, Toyota (JP)

(73) Assignee: KOJIMA INDUSTRIES CORPORATION, Aichi (JP)

( * ) Notice: Subject to any disclaimer, the term of this patent is extended or adjusted under 35 U.S.C. 154(b) by 435 days.

(21) Appl. No.: 18/484,450

(22) Filed: Oct. 11, 2023

(65) Prior Publication Data

US 2024/0123908 A1 Apr. 18, 2024

(30) Foreign Application Priority Data

Oct. 14, 2022 (JP) ................................. 2022-165770

(51) Int. Cl.
B60R 7/06 (2006.01)
E05B 83/30 (2014.01)

(52) U.S. Cl.
CPC ................ B60R 7/06 (2013.01); E05B 83/30 (2013.01)

(58) Field of Classification Search
CPC ................................... B60R 7/06; E05B 83/30
USPC ....................................................... 296/37.2
See application file for complete search history.

(56) References Cited

U.S. PATENT DOCUMENTS 8,191,935 B2 * 6/2012 Toppani ................. E05C 9/043
292/DIG. 37
11,377,884 B2 * 7/2022 Nakasone ................. E05C 9/04

11,821,244 B2 * 11/2023 Nakasone ............... E05B 83/30
12,371,931 B2 * 7/2025 Ishii ........................ E05B 83/30
12,485,829 B2 * 12/2025 Toriumi ................. E05B 81/36
12,523,070 B2 * 1/2026 Kondo .................... E05B 79/18
2014/0008921 A1 1/2014 Shimizu et al.
2017/0009497 A1 1/2017 Nakasone
2017/0067274 A1 * 3/2017 Yano ........................ E05C 3/34
2021/0095498 A1 * 4/2021 Kondo .................... E05C 9/043
2024/0263494 A1 * 8/2024 Minnich ............... E05B 79/08

FOREIGN PATENT DOCUMENTS

CN 212176864 U * 12/2020
JP H11227530 A 8/1999
JP 2000062541 A 2/2000
JP 2009255812 A 11/2009
JP 2013249607 A 12/2013

(Continued)

OTHER PUBLICATIONS

Office Action in JP Application No. 2022-165770 dated Aug. 3, 2023, 4pp.

*Primary Examiner* — Jason S Morrow
(74) *Attorney, Agent, or Firm* — HAUPTMAN HAM, LLP

(57) ABSTRACT

A glove box includes: an outer unit turning to open and to close; a lock unit that locks a closed state of the outer unit; a lock mechanism that includes an operation unit, an interlocking unit, and a base unit; an inner unit that closes an inner wall of the outer unit; a fitting portion that assembles the inner wall of the outer unit and the lock mechanism; and a receiving seat portion that receives the lock unit. Further, the inner unit has an inclined portion inclined to an inside of the inner unit from the inner wall side of the outer unit toward the through hole, and the inclined portion is in sliding contact with a distal end of the lock unit in a longitudinal direction when the outer unit and the inner unit are assembled.

6 Claims, 28 Drawing Sheets

(56)     References Cited

FOREIGN PATENT DOCUMENTS

| | | | |
|---|---|---|---|
| JP | 2015209095 | A | 11/2015 |
| JP | 5828888 | B2 | 12/2015 |
| JP | 6291028 | B2 | 3/2018 |
| JP | 6579288 | B1 | 9/2019 |
| JP | 2021133707 | A | 9/2021 |
| WO | 2013118326 | A1 | 8/2013 |
| WO | 2013129100 | A1 | 9/2013 |

* cited by examiner

(STATE S1)

(STATE S2)

(STATE S3)

GLOVE BOX

CROSS-REFERENCE TO RELATED APPLICATION

The present application claims priority to and incorporates by reference the entire contents of Japanese Patent Application No. 2022-165770 filed in Japan on Oct. 14, 2022.

BACKGROUND

The present disclosure relates to a glove box.

In the related art, glove boxes are known as a storage device installed in a vehicle compartment. In general, a glove box includes an outer unit having a function as a lid that can be opened and closed, an inner unit forming a storage space for articles, a pair of rods for locking the outer unit in a closed state, and a lock mechanism for operating the pair of rods in such a manner as to unlock the closed state of the outer unit. In addition, the lock mechanism includes a knob for performing unlocking operation, a link unit for operating the pair of rods in response to the operation of the knob, and a base unit to which the knob and the link unit are assembled in a freely turnable manner.

In the glove box, the pair of rods is each connected to the link unit of the lock mechanism and reciprocates in mutually opposite directions in a longitudinal direction as the link unit turns. The base unit of the lock mechanism is assembled to an inner wall of the outer unit in such a manner as to expose the knob from the back side (inner wall side) of the outer unit to the front side (outer wall side) through an opening. The inner unit is assembled to the outer unit in such a manner as to enclose the pair of rods and the lock mechanism between the inner unit and the inner wall of the outer unit. At this point, each distal end of the pair of rods can protrude and retract through a through hole formed in a side wall of the inner unit.

Such a glove box is freely turnably attached to, for example, an instrument panel and shifts, by turning, between a state in which the storage space for articles by the inner unit is closed (hereinafter referred to as a closed state) and a state in which the storage space is opened (hereinafter referred to as an open state). The glove box is locked in the closed state by engagement between the distal ends of the pair of rods protruding from the respective through holes of the inner unit and the respective holes formed in both side walls in the instrument panel. The closed state of the glove box is released by operating the knob to turn the link unit and to move the distal ends of the pair of rods to the inside of the inner unit.

As glove boxes of the related art, for example, glove boxes including lock devices described in Japanese Patent No. 5828888 and Japanese Patent No. 6291028 are disclosed. Alternatively, a glove box including a lock mechanism described in Japanese Patent No. 6579288 is disclosed.

SUMMARY

There is a need for providing a glove box capable of reducing time and effort required for assembly.

According to an embodiment, a glove box includes: an outer unit that is freely turnably provided in a vehicle compartment and turns to open and to close; a lock unit that locks a closed state of the outer unit in a releasable manner, the lock unit having a rod shape; a lock mechanism that includes an operation unit that unlocks the closed state of the outer unit, an interlocking unit that interlocks the operation unit and the lock unit, and a base unit to which the operation unit and the interlocking unit are provided; an inner unit that closes an inner wall of the outer unit to which the lock unit and the lock mechanism are assembled, the inner unit having a through hole through which the lock unit can protrude and retract; a fitting portion that assembles the inner wall of the outer unit and the lock mechanism to each other in a linear direction; and a receiving seat portion that receives the lock unit, the receiving seat portion being formed in a recessed shape opened in the linear direction. Further, the inner unit has an inclined portion inclined to an inside of the inner unit from the inner wall side of the outer unit toward the through hole, and the inclined portion is in sliding contact with a distal end of the lock unit in a longitudinal direction when the outer unit and the inner unit are assembled.

BRIEF DESCRIPTION OF THE DRAWINGS

FIG. 6 is a diagram illustrating a state in which the outer unit and a lock mechanism are assembled;

FIG. 15 is a perspective view illustrating a state in which the lock unit is assembled to the lock mechanism illustrated in FIG. 12;

FIG. 26 is a diagram illustrating a positional relationship between a protruding portion of the outer unit and a base unit of the lock assembly at the time of joining in the embodiment of the disclosure;

FIG. 29 is a schematic cross-sectional view illustrating an example of assembling the outer unit and the inner unit illustrated in FIG. 28.

DETAILED DESCRIPTION

Figure 1:
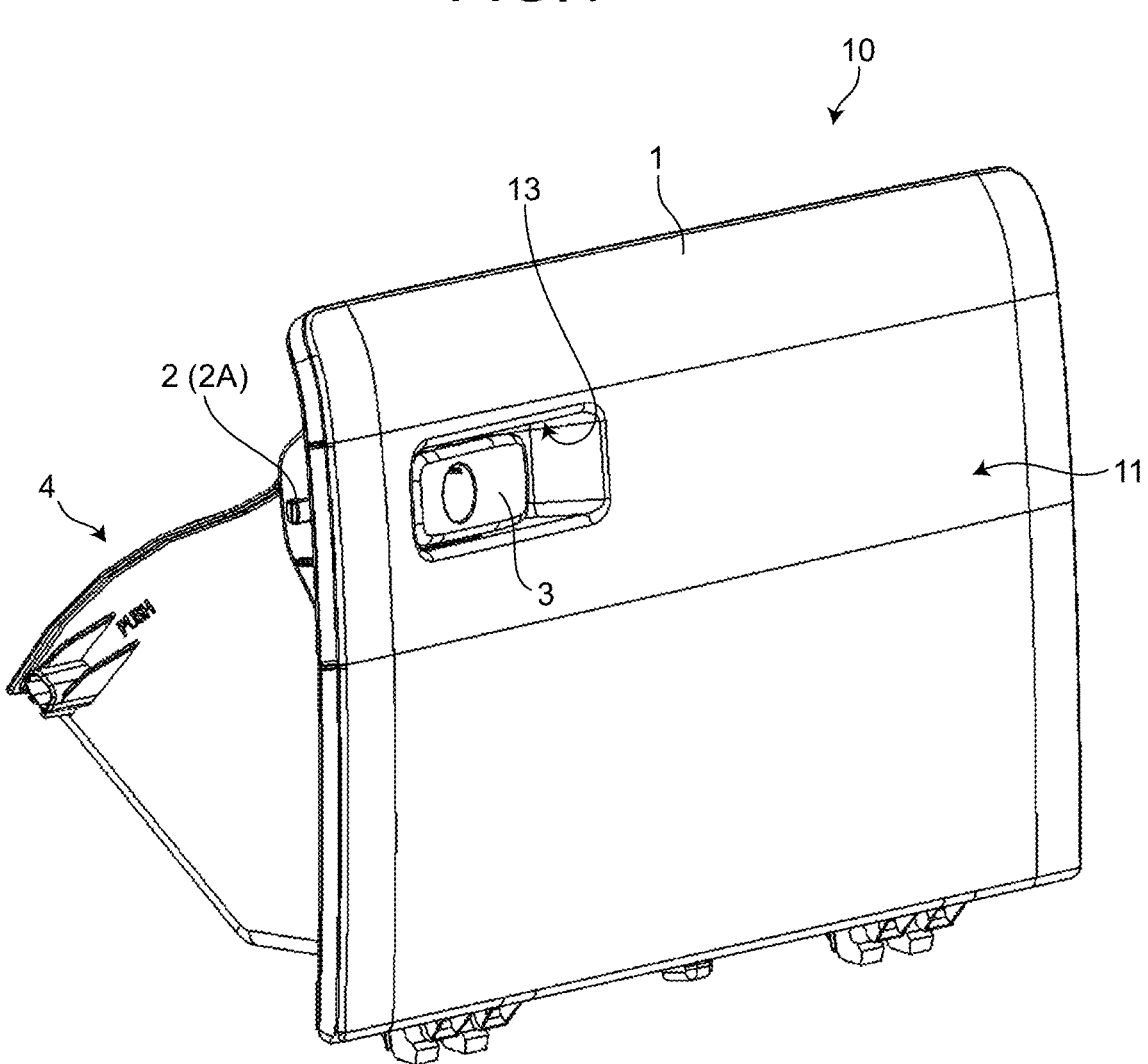
FIG. 1 is a front side perspective view illustrating a structure example of a glove box according to an embodiment of the present disclosure.

Generally, in assembling the related-art glove box, for example, when the lock mechanism is assembled to the outer unit, one side of the lower end of the base unit is inserted into the inner wall of the outer unit, and fitting claws of the outer unit are fitted into fitting holes of the base unit while the base unit is turned toward the outer unit around the lower end that has been inserted. Next, when the pair of rods is assembled to the lock mechanism, the distal ends of the rods are inserted into insertion holes (for example, a first insertion hole, a second insertion hole, and the like described in Japanese Patent No. 6291028) included in the inner wall of the outer unit, and pins of the link unit of the lock mechanism are fitted into fitting holes of the rods while the rods are turned toward the outer unit about the distal ends that have been inserted.

As described above, in assembling the related-art glove box, at least two-step work is required for each time one component is assembled, such as fitting the component while turning the component after inserting it. For this reason, assembling of components of the glove box is complicated, and assembling of the glove box having a large number of components to be assembled takes a lot of trouble and time (cycle time). In particular, in mass production of glove boxes, since an increase in time and effort required for assembly puts pressure on the production capacity, there is a possibility that it is required to add a production line of the glove box or the like. Hereinafter, preferred embodiments of a glove box according to the present disclosure will be described in detail with reference to the accompanying drawings. Note that the present disclosure is not limited by the embodiments. Incidentally, it should be noted that the drawings are schematic and that dimensional relationships of individual elements, ratios of individual elements, and others may be different from actual ones. The drawings may also include different dimensional relationships or different ratios in some parts. In the drawings, the same components are denoted by the same symbols.

Structure of Glove Box

Figure 2:
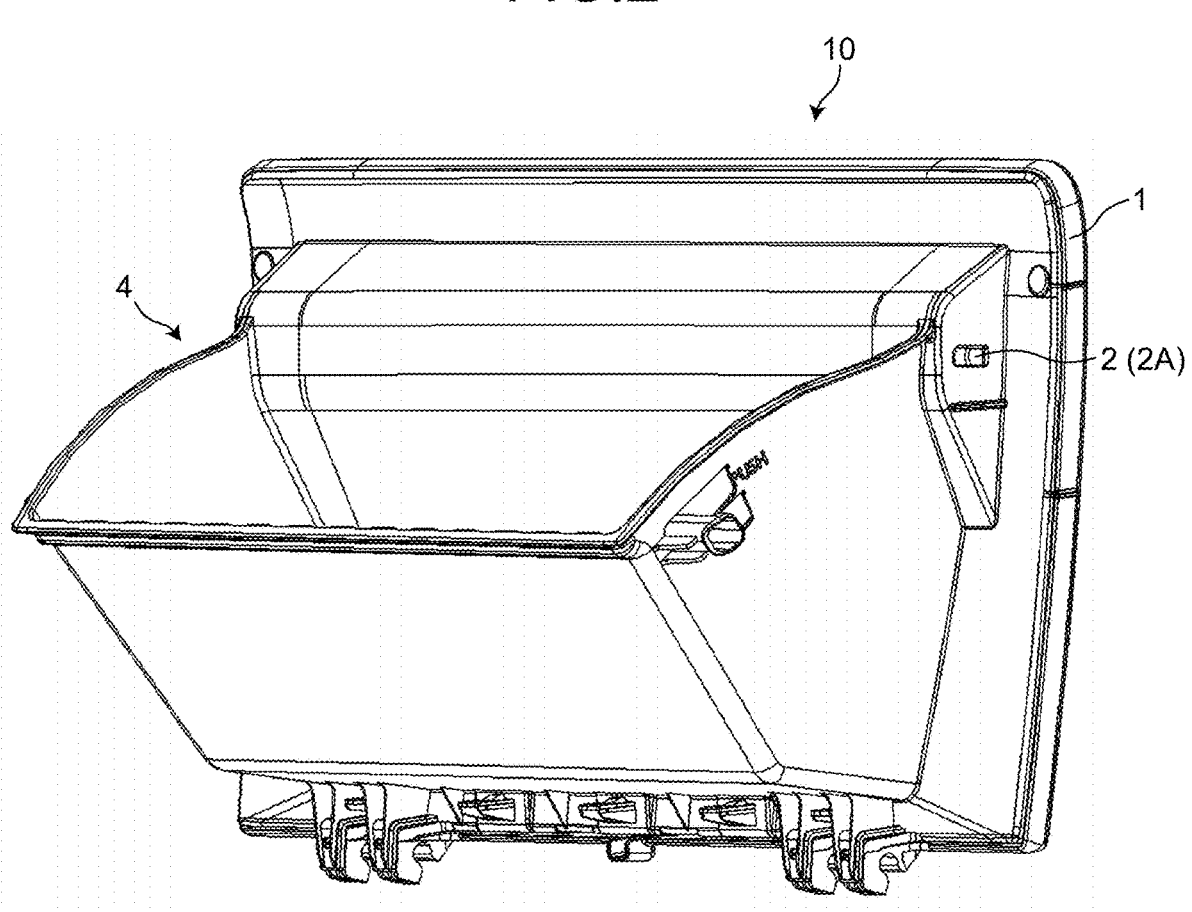
FIG. 2 is a back side perspective view illustrating a structure example of the glove box according to the embodiment of the disclosure.
Figure 3:
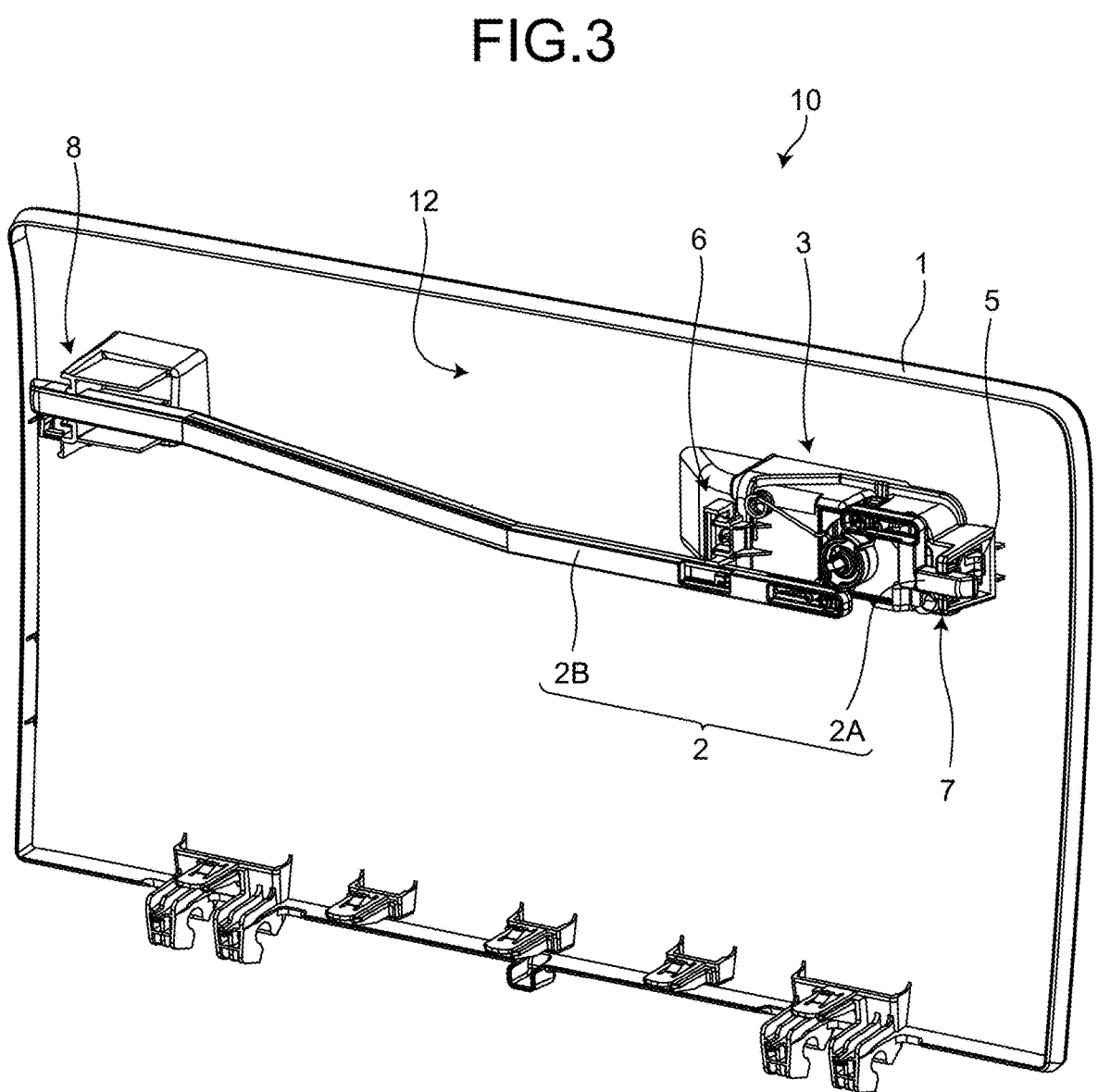
FIG. 3 is a perspective view illustrating an example of an internal structure of the glove box of the embodiment of the disclosure.

First, the structure of a glove box according to an embodiment of the disclosure will be described. FIG. 1 is a front side perspective view illustrating a structure example of the glove box according to the embodiment of the present disclosure. FIG. 1 is a diagram illustrating a glove box 10 as viewed from the front side (outer unit 1 side). FIG. 2 is a back side perspective view illustrating a structure example of the glove box according to the embodiment of the disclosure. FIG. 2 is a diagram illustrating the glove box 10 as viewed from the back side (inner unit 4 side). FIG. 3 is a perspective view illustrating an example of the internal structure of the glove box of the embodiment of the disclosure. FIG. 3 is a diagram in which the inner unit 4 is removed from the glove box 10 illustrated in FIG. 2.

The glove box 10 according to the embodiment of the disclosure is a storage device that is provided in a vehicle compartment such as an instrument panel of an automobile in an openable and closable manner and stores articles in such a manner that the articles can be taken in and out. Specifically, as illustrated in FIGS. 1 to 3, the glove box 10 includes an outer unit 1 having a function as a lid that can be opened and closed, a lock unit 2 that locks the closed state of the outer unit 1 in a releasable manner, a lock mechanism 3 for operating the lock unit 2, and an inner unit 4 having an article storing function.

An outer wall 11 of the outer unit 1 is a front-side wall of the glove box 10. When the outer unit 1 is in the closed state, the outer wall 11 forms, for example, a part of an outer surface (wall surface on the seat side) of the instrument panel. An inner wall 12 of the outer unit 1 is a wall on the opposite side of the outer wall 11. As illustrated in FIG. 3, the lock mechanism 3 is assembled to the inner wall 12 of the outer unit 1 by fitting portions 5 and 6. At this point, as illustrated in FIG. 1, a knob side of the lock mechanism 3 is exposed to the outer wall 11 side of the outer unit 1 through an opening 13 formed in the outer unit 1.

Furthermore, as illustrated in FIG. 3, the lock unit 2 includes a first rod 2A and a second rod 2B which are a pair of long and short rods. The first rod 2A and the second rod 2B are each assembled to the lock mechanism 3 with their distal ends facing opposite sides in the longitudinal direction. At this point, the distal end of the first rod 2A is received by a recessed receiving seat portion 7. The distal end of the second rod 2B is received by a receiving seat portion 8 having a recessed shape.

Meanwhile, as illustrated in FIGS. 1 and 2, the inner unit 4 is assembled to the outer unit 1 in such a manner as to cover the lock unit 2 and the lock mechanism 3 between the inner unit 4 and the inner wall 12 of the outer unit 1. The inner unit 4 forms a storage space for articles in the glove box 10. The distal end of the lock unit 2 can protrude and retract through a through hole formed in the side wall of the inner unit 4 similarly to the distal end of the first rod 2A illustrated in FIGS. 1 and 2, for example.

Although not particularly illustrated, the glove box 10 as described above is provided, for example, in a part of the instrument panel on the passenger's seat side in the vehicle compartment. In the glove box 10, in a case where the outer unit 1 closes the inner unit 4 inside the instrument panel, the outer unit 1 in this situation is in the closed state. That is, the glove box 10 is in the closed state. At this point, the distal end of the lock unit 2 protrudes from the through hole of the side wall of the inner unit 4 and engages with a hole (hereinafter, referred to as a lock hole) formed in a side wall in the instrument panel. As a result, the closed state of the outer unit 1 is locked. Meanwhile, in a case where the outer unit 1 opens the inner unit 4 from the inside of the instrument panel to the seat side in the vehicle compartment, the outer unit 1 in this state is in an open state. That is, the glove box 10 is in the open state. At this point, the distal end of the lock unit 2 moves to the inside of the inner unit 4 through the through hole to release the engagement with the lock hole. As a result, the lock of the closed state of the outer unit 1 is released.

Note that, in the present embodiment, as illustrated in FIGS. 1 and 3, the glove box 10 includes the lock mechanism 3 at a position deviated from the center toward one end side in the width direction (for example, the left side of the plane of drawing of FIG. 1) to face the outer wall 11 of the outer unit 1. As a result, for example, the lock mechanism 3 of the glove box 10 located on a passenger's seat side can be easily reached by a user from a driver's seat and can be easily operated. That is, the glove box 10 is suitable for left-hand drive vehicles. Although not particularly illustrated, the glove box 10 may include the lock mechanism 3 at a position deviated from the center toward the other end side in the width direction (for example, the right side in the plane of drawing of FIG. 1) to face the outer wall 11 of the outer unit 1, namely, may be suitable for right-hand drive vehicles.

Hereinafter, each component such as the outer unit 1, the lock unit 2, the lock mechanism 3, and the inner unit 4 included in the glove box 10 will be described in detail.

Structure of Outer Unit

Figure 4:
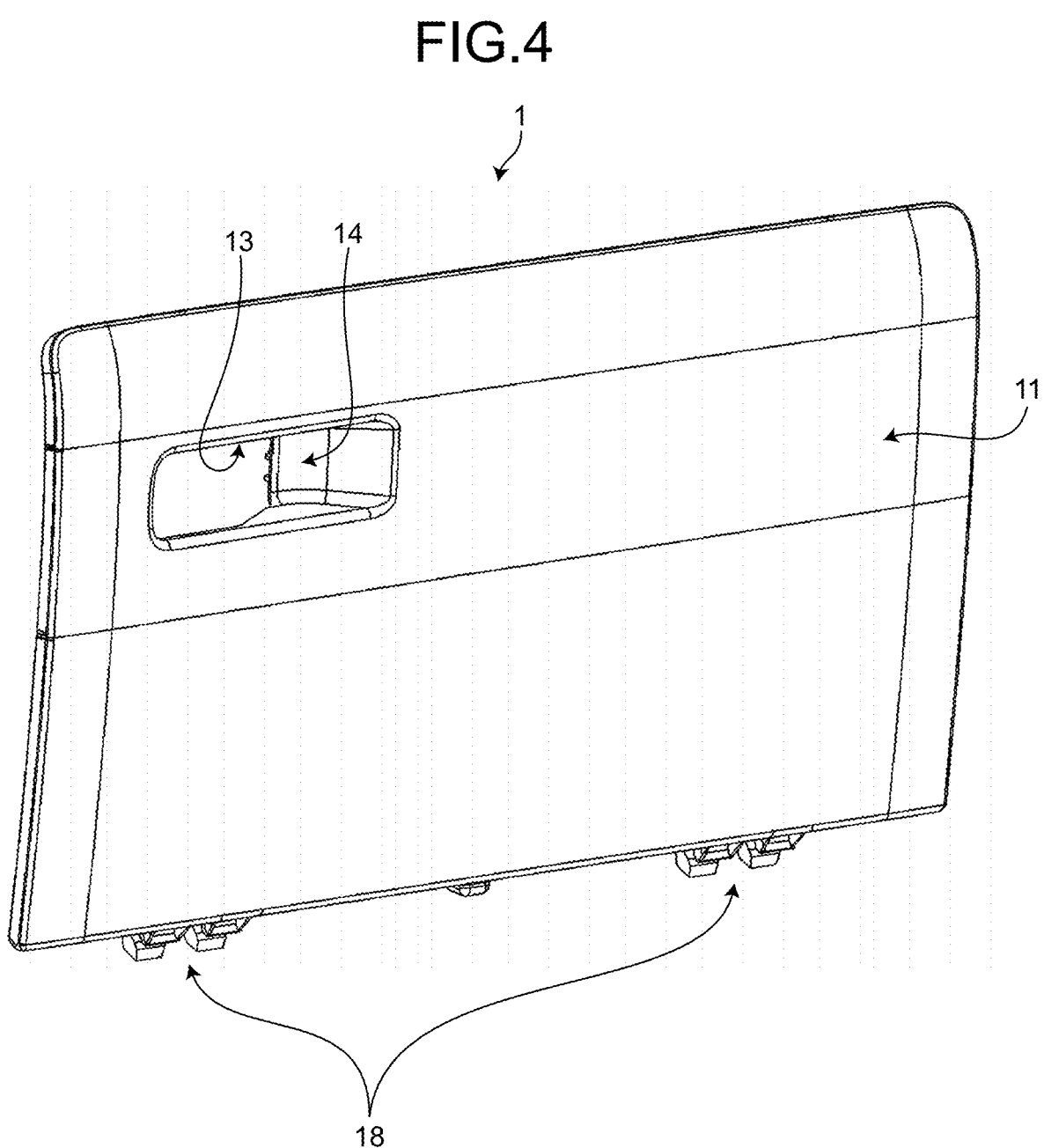
FIG. 4 is a front side perspective view illustrating a structure example of an outer unit of the glove box of the embodiment of the disclosure.
Figure 5:
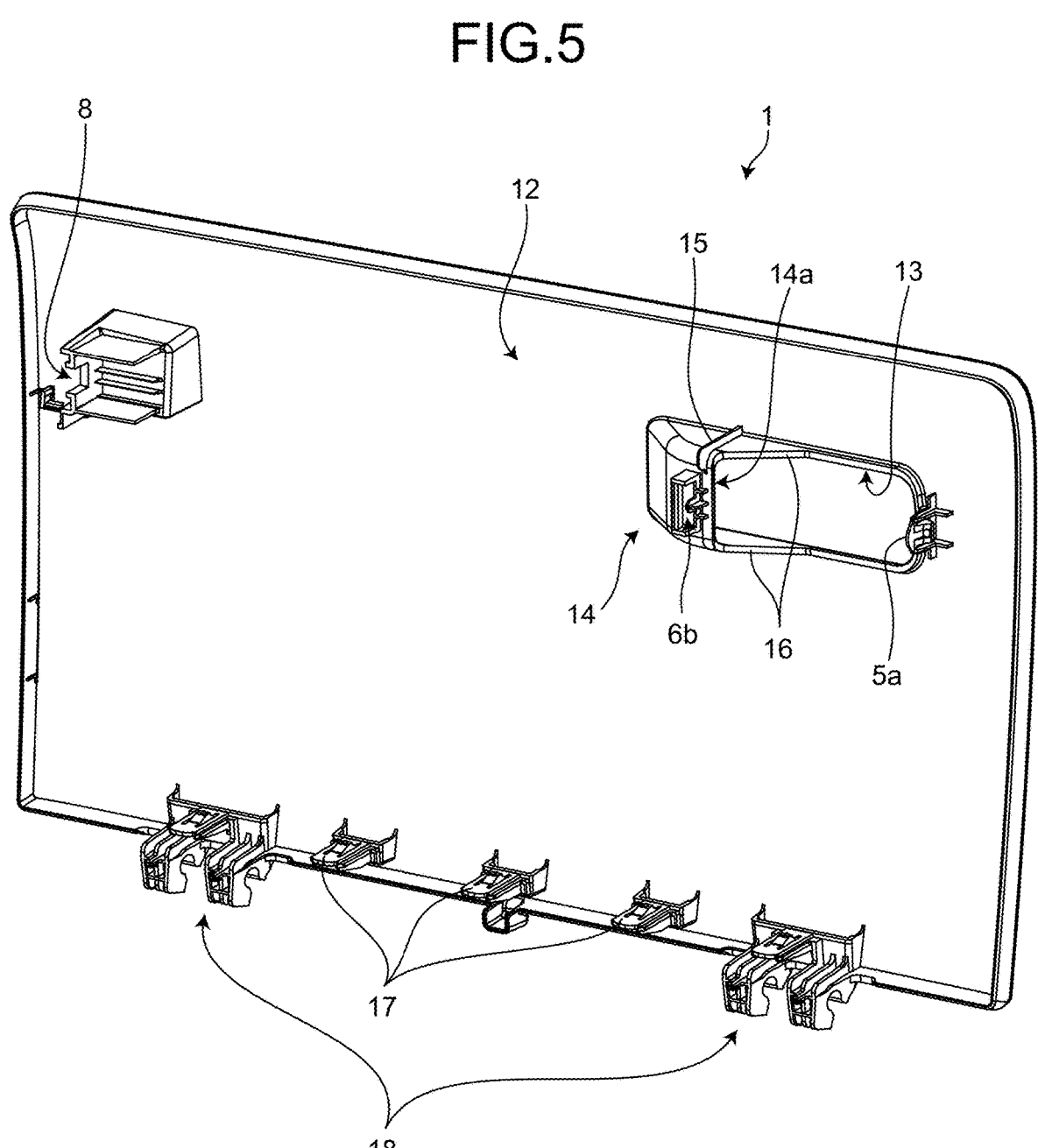
FIG. 5 is a back side perspective view illustrating the structure example of the outer unit of the glove box of the embodiment of the disclosure.
Figure 6:
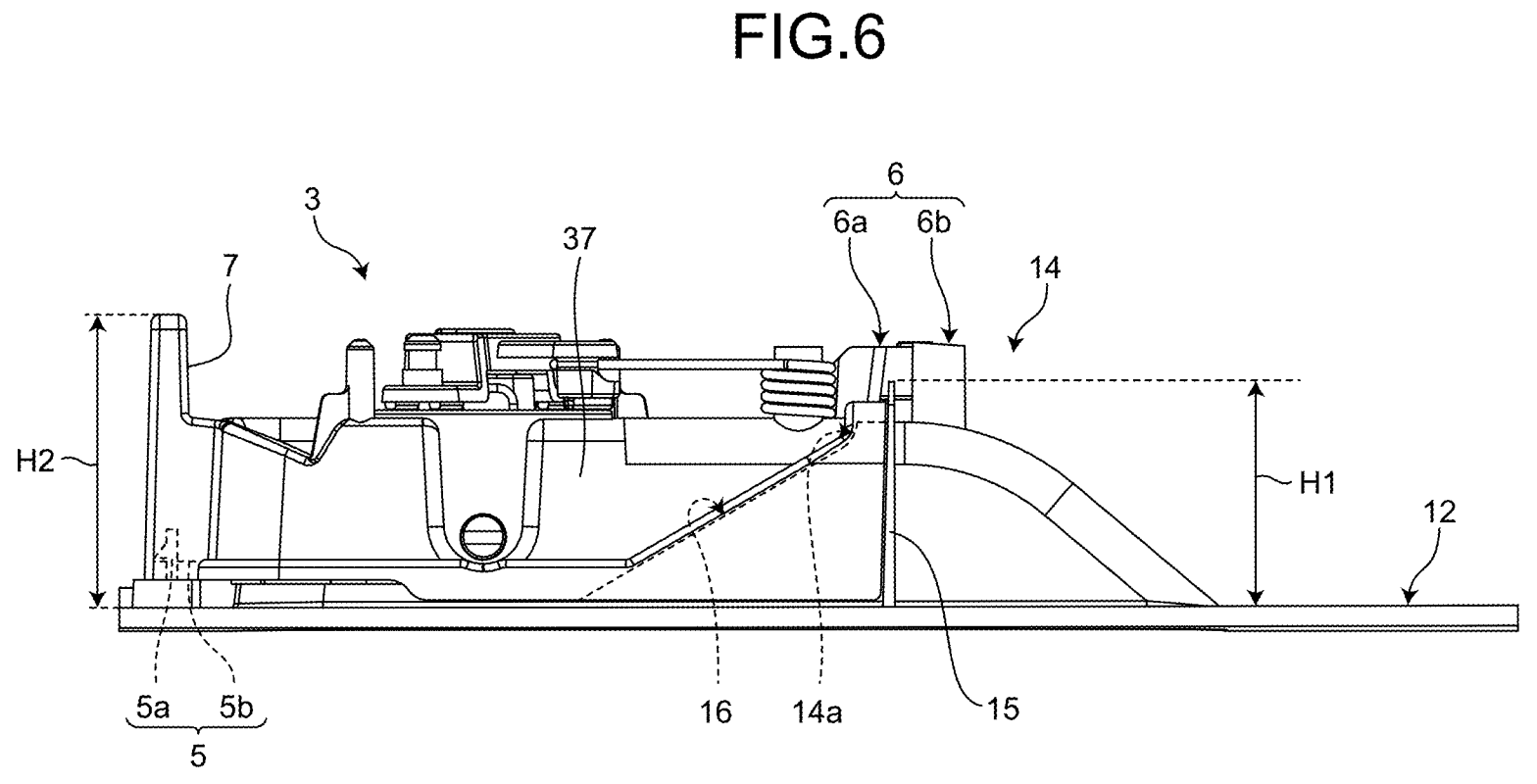

The structure of the outer unit 1 will be described in detail. FIG. 4 is a front side perspective view illustrating a structure example of the outer unit of the glove box of the embodiment of the disclosure. FIG. 5 is a back side perspective view illustrating the structure example of the outer unit of the glove box of the embodiment of the disclosure. FIG. 6 is a diagram illustrating a state in which the outer unit and the lock mechanism are assembled.

The outer unit 1 is freely turnably provided in the vehicle compartment and rotates to open and close. Specifically, as illustrated in FIGS. 4 to 6, the outer unit 1 includes the opening 13, a protruding portion 14, a guide portion 15, first engagement portions 16, fitting claws 17, and shaft support portions 18.

As illustrated in FIG. 3, the opening 13 allows an operation unit (described later) of the lock mechanism 3 assembled to the inner wall 12 of the outer unit 1 to be exposed the outer wall 11 side of the outer unit 1 (see FIG. 1). For example, as illustrated in FIGS. 4 and 5, the opening 13 is formed at a predetermined portion of the outer unit 1 (portion to which the lock mechanism 3 is assembled) in such a manner as to communicate the outer wall 11 side and the inner wall 12 side of the outer unit 1. The size of the opening 13 is preferably set depending on the size of a base unit 37 of the lock mechanism 3.

As illustrated in FIGS. 4 and 5, the protruding portion 14 is formed in a recessed shape toward the inner wall 12 side of the outer unit 1 along the edge of the opening 13. As illustrated in FIG. 6, an end 14a of the protruding portion 14 is joined in such a manner as to overlap an end of the base unit 37 of the lock mechanism 3. As a result, the protruding portion 14 forms a space recessed from the outer wall 11 side to the inner wall 12 side of the outer unit 1, namely, an operation space which is a space for operating the operation unit (specifically, a knob described later) of the lock mechanism 3.

The guide portion 15 regulates a joining position of the base unit 37 of the lock mechanism 3 with the protruding portion 14. Specifically, as illustrated in FIGS. 5 and 6, the guide portion 15 has a rib shape protruding from a side wall to a top portion of the protruding portion 14 and is provided on an outer wall of the protruding portion 14 in such a manner as to be separated from the end 14a of the protruding portion 14 by a predetermined distance. The maximum height H1 of the guide portion 15 from the inner wall 12 of the outer unit 1 is equal to or less than the maximum height H2 of the lock mechanism 3. In the present specification, the maximum height H2 of the lock mechanism 3 is the maximum height of the lock mechanism 3 assembled to the inner wall 12 of the outer unit 1 from the inner wall 12 of the outer unit 1. For example, as illustrated in FIG. 6, the maximum height H2 of the lock mechanism 3 is the height from the inner wall 12 of the outer unit 1 to the upper end of the receiving seat portion 7 included in the base unit 37 of the lock mechanism 3. The guide portion 15 as the above comes into contact with the end of the base unit 37 when the lock mechanism 3 is assembled to the inner wall 12 of the outer unit 1. As a result, the guide portion 15 guides the end of the base unit 37 to the joining position with the protruding portion 14 and regulates the joining position of the base unit 37 with the protruding portion 14 so that the overlapping region of the base unit 37 and the protruding portion 14 does not become excessive.

The first engagement portions 16 are engaged with second engagement portions (described later) formed on an inner wall of the base unit 37 of the lock mechanism 3 to form a parting line between the base unit 37 and the protruding portion 14. Specifically, as illustrated in FIGS. 5 and 6, the first engagement portions 16 are formed in an inclined shape descending from the top portion side of the protruding portion 14 toward the opening 13 along side walls on both sides of the protruding portion 14 facing each other across the opening 13. When the lock mechanism 3 is assembled to the inner wall 12 of the outer unit 1, the first engagement portions 16 are engaged with the second engagement portions of the base unit 37, whereby the parting line between the base unit 37 and the protruding portion 14 is formed in such a manner as to be hidden behind the operation unit of the lock mechanism 3 (on the top portion side of the protruding portion 14).

The fitting claws 17 are for assembling the outer unit 1 and the inner unit 4 to each other. For example, as illustrated in FIG. 5, a plurality of fitting claws 17 is erected on the inner wall 12 along the peripheral edge of the outer unit 1. The fitting claws 17 as the above are fitted into fitting holes (not illustrated) of the inner unit 4 when the inner unit 4 is assembled to the outer unit 1.

The shaft support portions 18 are provided to freely turnably provide the outer unit 1 in the vehicle compartment. For example, as illustrated in FIGS. 4 and 5, a plurality of shaft support portions 18 is provided on the inner wall 12 and is each formed in an arm shape extending from the inner wall 12 of the outer unit 1 toward the lower end side. The shaft support portions 18 are attached to, for example, a turning shaft (not illustrated) provided at a predetermined portion (for example, the instrument panel) in the vehicle compartment. The outer unit 1 is freely rotatable about the turning shaft pivotally supported by the shaft support portions 18 and rotates to open and close.

As illustrated in FIG. 5, the outer unit 1 further includes a fitting claw 5*a* and a fitting hole 6*b* for assembling the lock mechanism 3 and the receiving seat portion 8 for receiving the lock unit 2. As illustrated in FIGS. 5 and 6, for example, the fitting claw 5*a* is arranged in the vicinity of an end of the opening 13 (an end on the opposite side to the protruding portion 14) and is erected on the inner wall 12 of the outer unit 1. The fitting claw 5*a* is fitted into a fitting hole 5*b* of the base unit 37 when the lock mechanism 3 is assembled to the inner wall 12 of the outer unit 1. That is, the fitting claw 5*a* and the fitting hole 5*b* fitted to each other constitute a fitting portion 5 that assembles the outer unit 1 and the lock mechanism 3 to each other in a linear direction.

The fitting hole 6*b* is, for example, as illustrated in FIGS. 5 and 6, included at the top portion of the protruding portion 14. The fitting hole 6*b* is fitted with a fitting claw 6*a* of the base unit 37 when the lock mechanism 3 is assembled to the inner wall 12 of the outer unit 1. That is, the fitting claw 6*a* and the fitting hole 6*b* fitted to each other constitute a fitting portion 6 that assembles the outer unit 1 and the lock mechanism 3 to each other in a linear direction. The fitting direction of the fitting claw 6*a* and the fitting hole 6*b* is the same linear direction as the fitting direction of the fitting claw 5*a* and the fitting hole 5*b* described above.

The receiving seat portion 8 is an example of a receiving seat portion that receives the lock unit 2. Specifically, as illustrated in FIG. 5, the receiving seat portion 8 is formed in a recessed shape that opens in the same linear direction as the fitting directions of the fitting portions 5 and 6 described above and is provided on the inner wall 12 of the outer unit 1. The receiving seat portion 8 receives the second rod 2B which is the longer one of the pair of long and short rods of the lock unit 2 (see FIG. 3) assembled to the lock mechanism 3. More specifically, the receiving seat portion 8 receives the distal end of the second rod 2B in a state where the distal end can reciprocate in the longitudinal direction thereof.

Structure of Lock Unit

Figure 7:
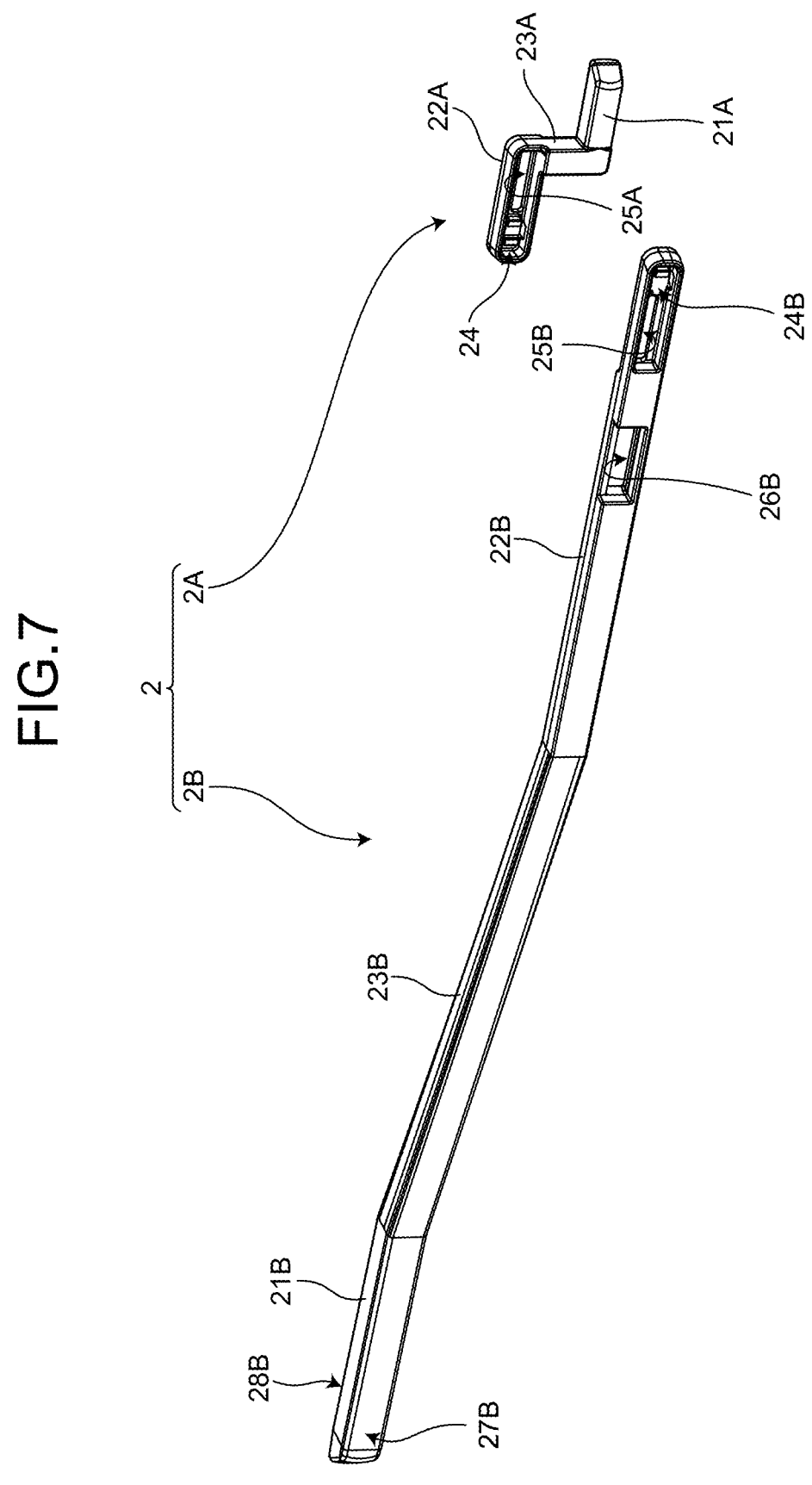
FIG. 7 is a perspective view illustrating a structure example of a lock unit of the glove box of the embodiment of the disclosure.

The structure of the lock unit 2 will be described in detail. FIG. 7 is a perspective view illustrating a structure example of the lock unit of the glove box of the embodiment of the disclosure. Illustrated in FIG. 7 is the lock unit 2 as viewed from the inner wall 12 side (see FIG. 3) of the outer unit 1 described above. The lock unit 2 is a rod-shaped structure that locks the closed state of the outer unit 1 described above in a releasable manner and includes, for example, as illustrated in FIG. 7, the pair of long and short rods of the first rod 2A and the second rod 2B. In the lock unit 2, the first rod 2A is a shorter rod, and the second rod 2B is a longer rod. Hereinafter, the structure of each of the first rod 2A and the second rod 2B will be described in detail.

Structure of First Rod

Figure 8:
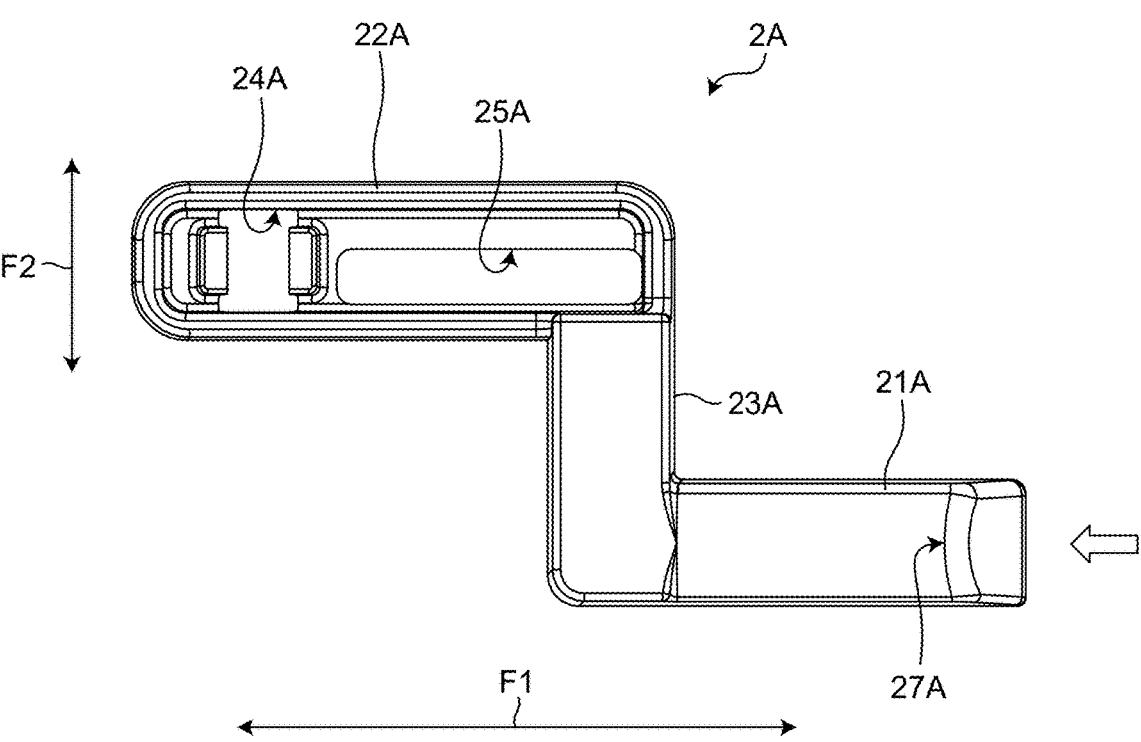
FIG. 8 is a diagram illustrating a structure example of a first rod of the lock unit of the embodiment of the disclosure.
Figure 9:
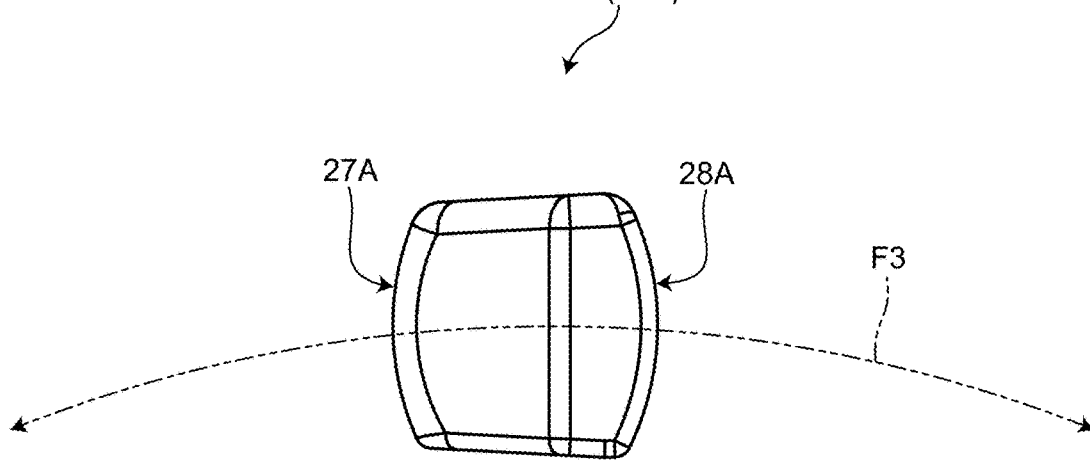
FIG. 9 is a diagram of the first rod illustrated in FIG. 8 as viewed from a distal end side.

The structure of the first rod 2A of the lock unit 2 will be described in detail. FIG. 8 is a diagram illustrating a structure example of the first rod of the lock unit of the embodiment of the disclosure. FIG. 9 is a diagram of the first rod illustrated in FIG. 8 as viewed from the distal end side. FIG. 9 is a diagram illustrating a protruding and retracting portion 21A of the first rod 2A illustrated in FIG. 8 as viewed from the distal end side (direction of a wide arrow in FIG. 8). As illustrated in FIGS. 8 and 9, the first rod 2A includes the protruding and retracting portion 21A, a proximal end 22A, a connecting portion 23A, a fitting hole 24A, a regulation hole 25A, and receiving surfaces 27A and 28A. Note that, in FIG. 8, a longitudinal direction F1 is the longitudinal direction of the first rod 2A, and a width direction F2 is the width direction of the first rod 2A. The longitudinal direction F1 and the width direction F2 are directions perpendicular to each other.

The protruding and retracting portion 21A is the distal end of the first rod 2A in the longitudinal direction F1 and protrudes and retracts through the through hole (described later) of the inner unit 4 when the first rod 2A reciprocates in the longitudinal direction F1. The proximal end 22A is a portion to be assembled to an interlocking unit (described later) of the lock mechanism 3. The connecting portion 23A is a portion that integrally connects the protruding and retracting portion 21A and the proximal end 22A. For example, as illustrated in FIG. 8, the connecting portion 23A connects the protruding and retracting portion 21A and the proximal end 22A in such a manner as to be separated from each other in the width direction F2 of the first rod 2A.

The fitting hole 24A is a hole for assembling the first rod 2A to the interlocking unit of the lock mechanism 3. Specifically, as illustrated in FIG. 8, the fitting hole 24A is a hole that is long in the width direction F2 perpendicular to the longitudinal direction of the lock unit 2 (longitudinal direction F1 of the first rod 2A in FIG. 8) and is formed on one end side of the proximal end 22A (an end side opposite to the protruding and retracting portion 21A). When the first rod 2A is assembled to the interlocking unit of the lock mechanism 3, a fitting pin (described later) of the interlocking unit is fitted into the fitting hole 24A.

The regulation hole 25A is a hole for regulating the motion direction of the first rod 2A. Specifically, as illustrated in FIG. 8, the regulation hole 25A is a hole that is long in the longitudinal direction F1 of the first rod 2A and is formed in the proximal end 22A on the side of the protruding and retracting portion 21A with respect to the fitting hole 24A. When the first rod 2A is assembled to the interlocking unit of the lock mechanism 3, a regulation pin (described later) of the lock mechanism 3 is inserted into the regulation hole 25A.

The receiving surfaces 27A and 28A are surfaces that receive a load in a turning direction F3 (see FIG. 9) of the outer unit 1. Specifically, as illustrated in FIG. 9, the receiving surface 27A is one end surface of both ends in the thickness direction of the first rod 2A, and the receiving surface 28A is the other end surface of both ends in the thickness direction. Each of the receiving surfaces 27A and 28A is formed in an arc shape and intersects with the turning direction F3. That is, each of the receiving surfaces 27A and 28A receives a load in the turning direction F3.

Note that the thickness direction of the first rod 2A is a direction perpendicular to the longitudinal direction F1 and the width direction F2 (see FIG. 8) of the first rod 2A. Incidentally, the load in the turning direction F3 of the outer unit 1 is a load applied in the turning direction F3 by the weight of the glove box 10 itself.

Figure 10:
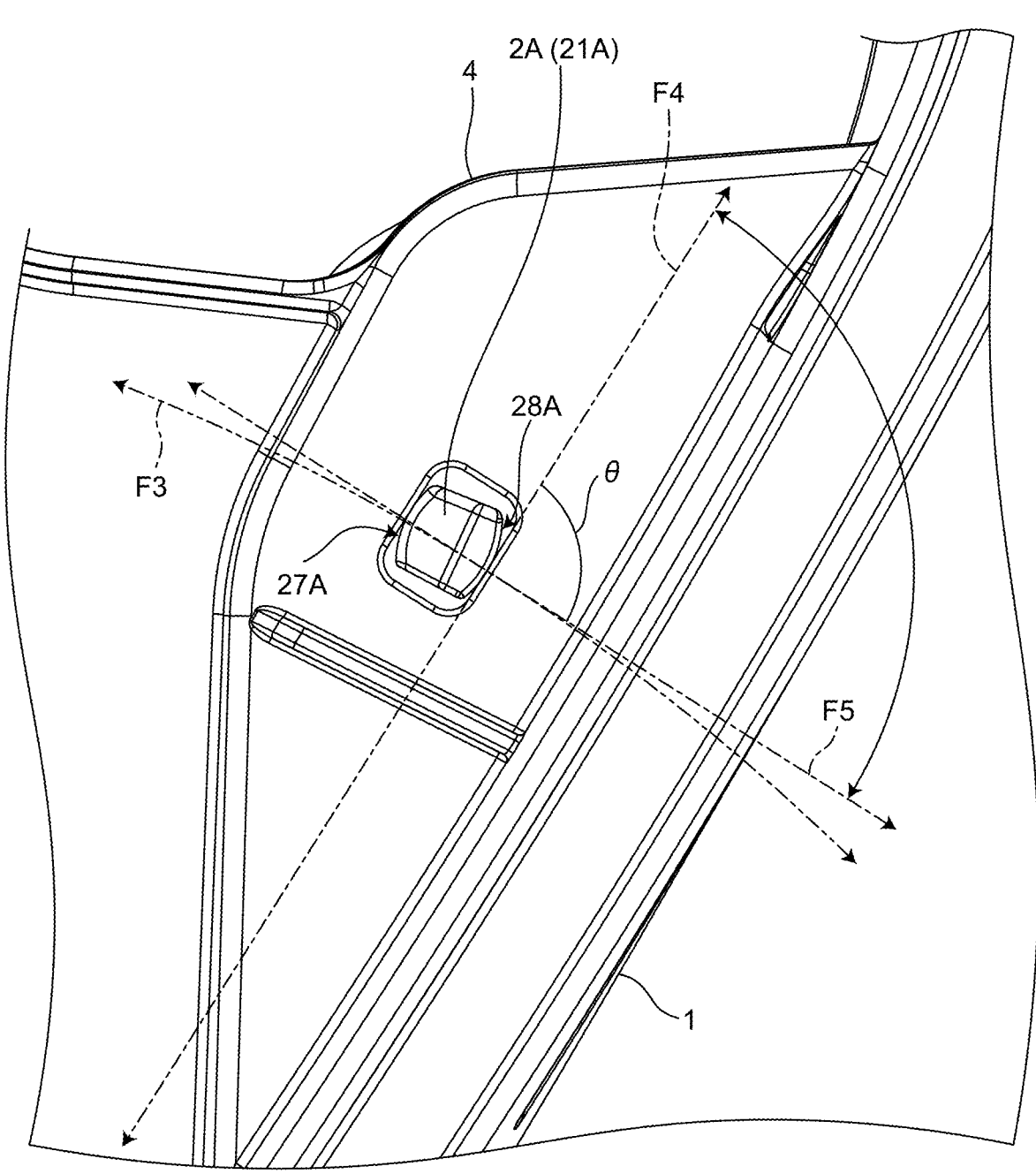
FIG. 10 is a diagram illustrating a state in which a protruding and retracting portion of the first rod protrudes from a through hole of an inner unit side wall of the glove box.

FIG. 10 is a diagram illustrating a state in which the protruding and retracting portion of the first rod protrudes from the through hole in the inner unit side wall of the glove box. As illustrated in FIG. 10, the first rod 2A causes the protruding and retracting portion 21A to protrude through the through hole formed in the side wall of the inner unit 4. In this state, the protruding and retracting portion 21A receives a load in the turning direction F3 on the receiving surfaces 27A and 28A. For example, the receiving surface 27A receives the weight of the glove box 10 from an edge of the through hole of the inner unit 4 as a load in the turning direction F3. When the protruding and retracting portion 21A is engaged with the lock hole (not illustrated) in the vehicle compartment, the receiving surface 27B receives the weight of the glove box 10 from the inner wall surface of the lock hole as a load in the turning direction F3.

Such receiving surfaces 27A and 28A are preferably surfaces orthogonal to the turning direction F3 from the viewpoint of suppressing unevenness of the load in the turning direction F3 applied to the protruding and retracting portion 21A. Specifically, as illustrated in FIG. 10, an angle θ formed by a reference direction F4 and a tangential direction F5 of the receiving surface 28A is preferably a right angle (90°). Incidentally, the reference direction F4 is a direction orthogonal to the turning center axis of the outer unit 1 (turning center axis of the glove box 10) and in contact with the receiving surface 28A. The tangential direction F5 is a direction in contact with the turning direction F3 at an intersection of the turning direction F3 and the receiving surface 28A. Although not particularly illustrated, in a case where the reference direction F4 is set to a direction orthogonal to the turning center axis of the outer unit 1 and in contact with the receiving surface 27A and the tangential direction F5 is set to a direction in contact with the turning direction F3 at the intersection of the turning direction F3 and the receiving surface 27A, an angle θ formed by the reference direction F4 and the tangential direction F5 is preferably a right angle also for the receiving surface 27A.

Structure of Second Rod

Figure 11:
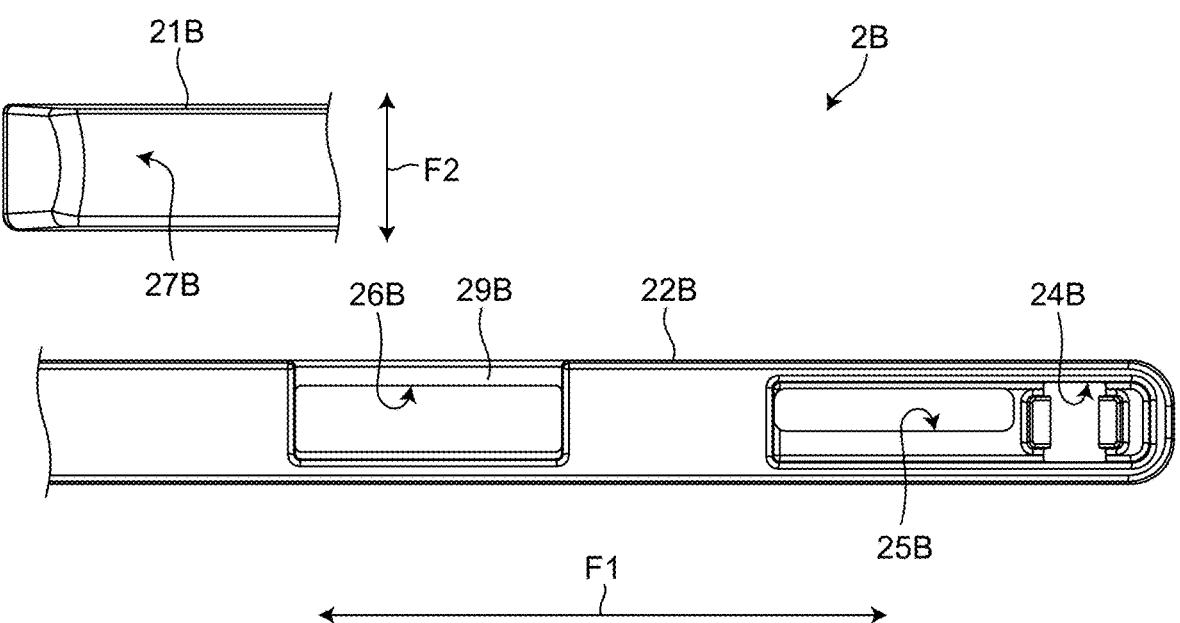
FIG. 11 is a diagram illustrating a structure example of a second rod of the lock unit of the embodiment of the disclosure.

The structure of the second rod 2B of the lock unit 2 will be described in detail. FIG. 11 is a diagram illustrating a structure example of the second rod of the lock unit of the embodiment of the disclosure. For convenience of description, FIG. 11 is a diagram illustrating in which a connecting portion 23B and the vicinity thereof of the second rod 2B illustrated in FIG. 7 are omitted. As illustrated in FIGS. 7 and 11, the second rod 2B includes a protruding and retracting portion 21B, a proximal end 22B, the connecting portion 23B, a fitting hole 24B, a regulation hole 25B, a claw hole 26B, and receiving surfaces 27B and 28B. Note that, in FIG. 11, a longitudinal direction F1 is the longitudinal direction of the second rod 2B, and a width direction F2 is the width direction of the second rod 2B. The longitudinal direction F1 and the width direction F2 are similar to the longitudinal direction and the width direction of the first rod 2A illustrated in FIG. 8.

The protruding and retracting portion 21B is a distal end of the second rod 2B in the longitudinal direction F1 and protrudes and retracts through a through hole of the inner unit 4 when the second rod 2B reciprocates in the longitudinal direction F1. The proximal end 22B is a portion to be assembled to the interlocking unit of the lock mechanism 3. The connecting portion 23B is a portion that integrally connects the protruding and retracting portion 21B and the proximal end 22B. For example, as illustrated in FIGS. 7 and 11, the connecting portion 23B connects the protruding and retracting portion 21B and the proximal end 22B in such a manner as to be separated from each other in the width direction F2 of the second rod 2B.

The fitting hole 24B is a hole for assembling the second rod 2B to the interlocking unit of the lock mechanism 3. Specifically, as illustrated in FIG. 11, the fitting hole 24B is a hole that is long in the width direction F2 perpendicular to the longitudinal direction of the lock unit 2 (the longitudinal direction F1 of the second rod 2B in FIG. 11) and is formed on one end side of the proximal end 22B (an end side opposite to the protruding and retracting portion 21B). When the second rod 2B is assembled to the interlocking unit of the lock mechanism 3, a fitting pin (described later) of the interlocking unit is fitted into the fitting hole 24B.

The regulation hole 25B is a hole for regulating the motion direction of the second rod 2B. Specifically, as illustrated in FIG. 11, the regulation hole 25B is a hole that is long in the longitudinal direction F1 of the second rod 2B and is formed in the proximal end 22B on the side of the protruding and retracting portion 21B with respect to the fitting hole 24B. When the second rod 2B is assembled to the interlocking unit of the lock mechanism 3, a regulation pin (described later) of the lock mechanism 3 is inserted into the regulation hole 25B.

The claw hole 26B is a hole for suppressing swinging of the second rod 2B. Specifically, as illustrated in FIG. 11, the claw hole 26B is a hole that is long in the longitudinal direction F1 of the second rod 2B and is formed in the proximal end 22B on the side of the protruding and retracting portion 21B with respect to the regulation hole 25B. When the second rod 2B is assembled to the interlocking unit of the lock mechanism 3, a claw portion (described later) of the lock mechanism 3 is fitted into the claw hole 26B. As illustrated in FIG. 11, the claw hole 26B has an edge 29B that overlaps with a protrusion of the claw portion.

The receiving surfaces 27B and 28B are surfaces that receive a load in the turning direction F3 of the outer unit 1. Specifically, as illustrated in FIGS. 7 and 11, the receiving surface 27B is one end surface of both ends in the thickness direction of the second rod 2B, and the receiving surface 28B is the other end surface of both ends in the thickness direction. The receiving surfaces 27B and 28B are formed in an arc shape and intersect with the turning direction F3 similarly to the receiving surfaces 27A and 28A of the first rod 2A described above. That is, the load in the turning direction F3 received by each of the receiving surfaces 27B and 28B is similar to that of the receiving surfaces 27A and 28A of the first rod 2A described above.

Structure of Lock Mechanism

Figure 12:
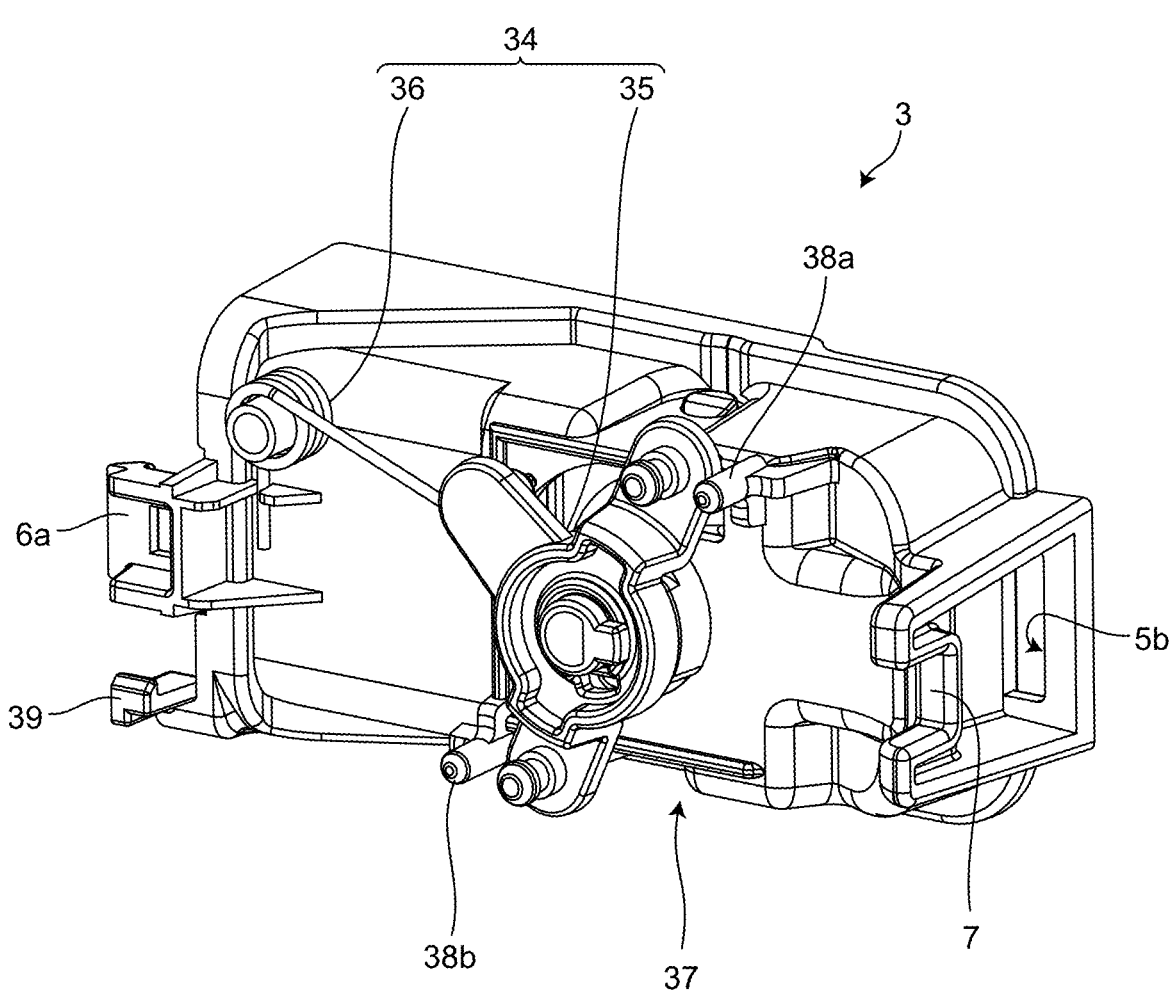
FIG. 12 is a perspective view illustrating a structure example of a lock mechanism of the embodiment of the disclosure.
Figure 13:
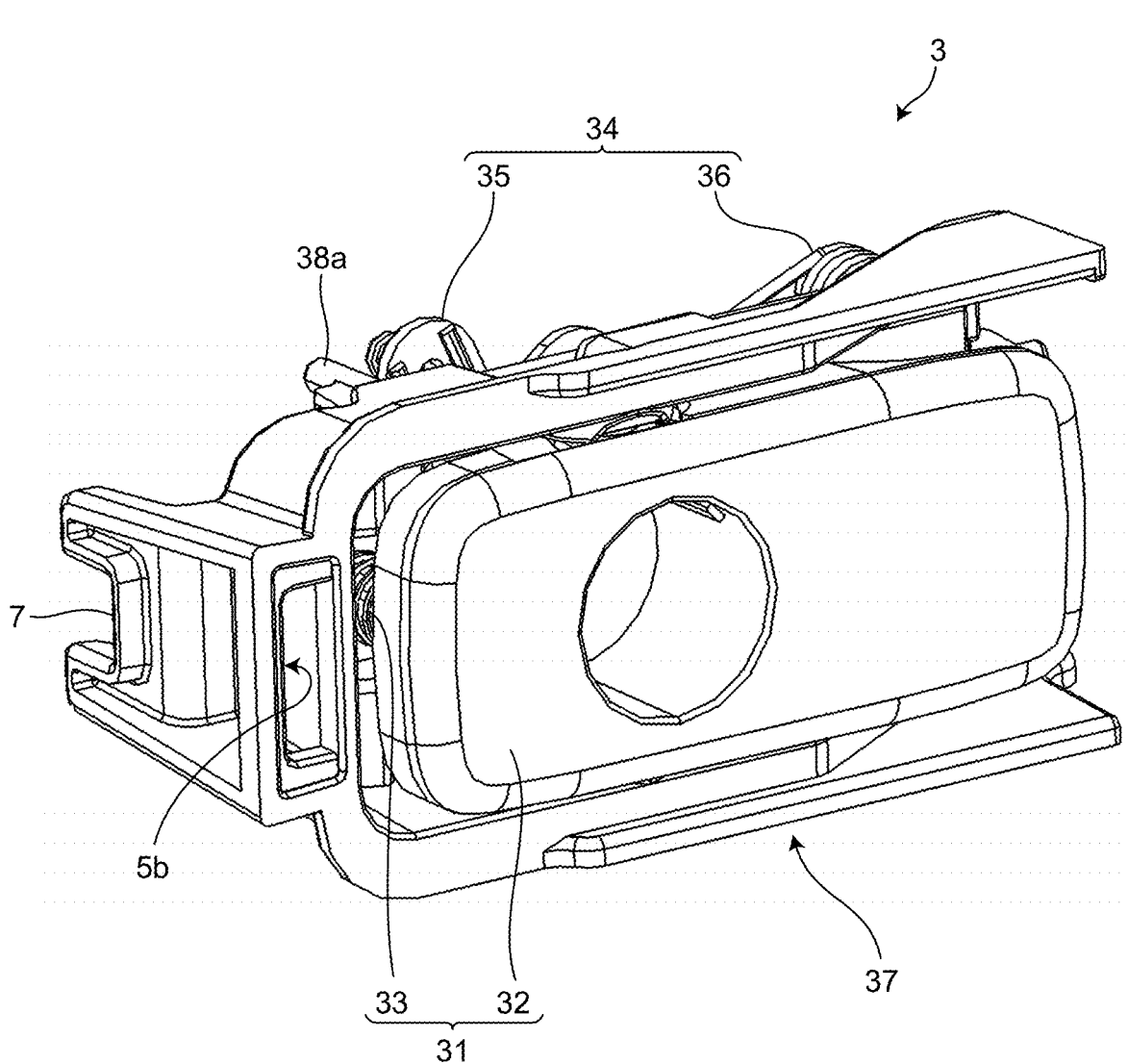
FIG. 13 is a perspective view of the lock mechanism illustrated in FIG. 12 as viewed from an operation unit side.
Figure 14:
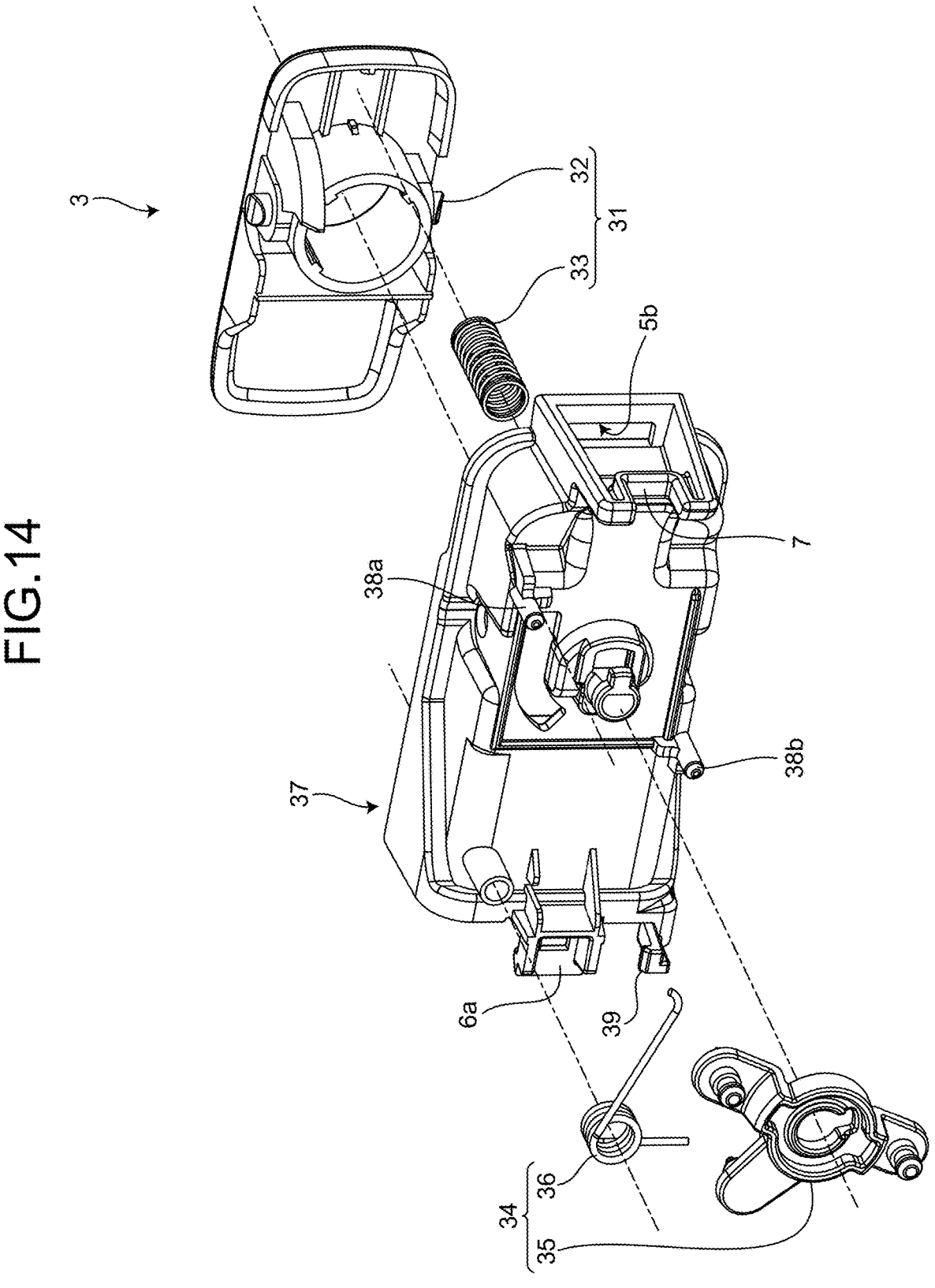
FIG. 14 is an exploded view of the lock mechanism illustrated in FIG. 12.
Figure 15:
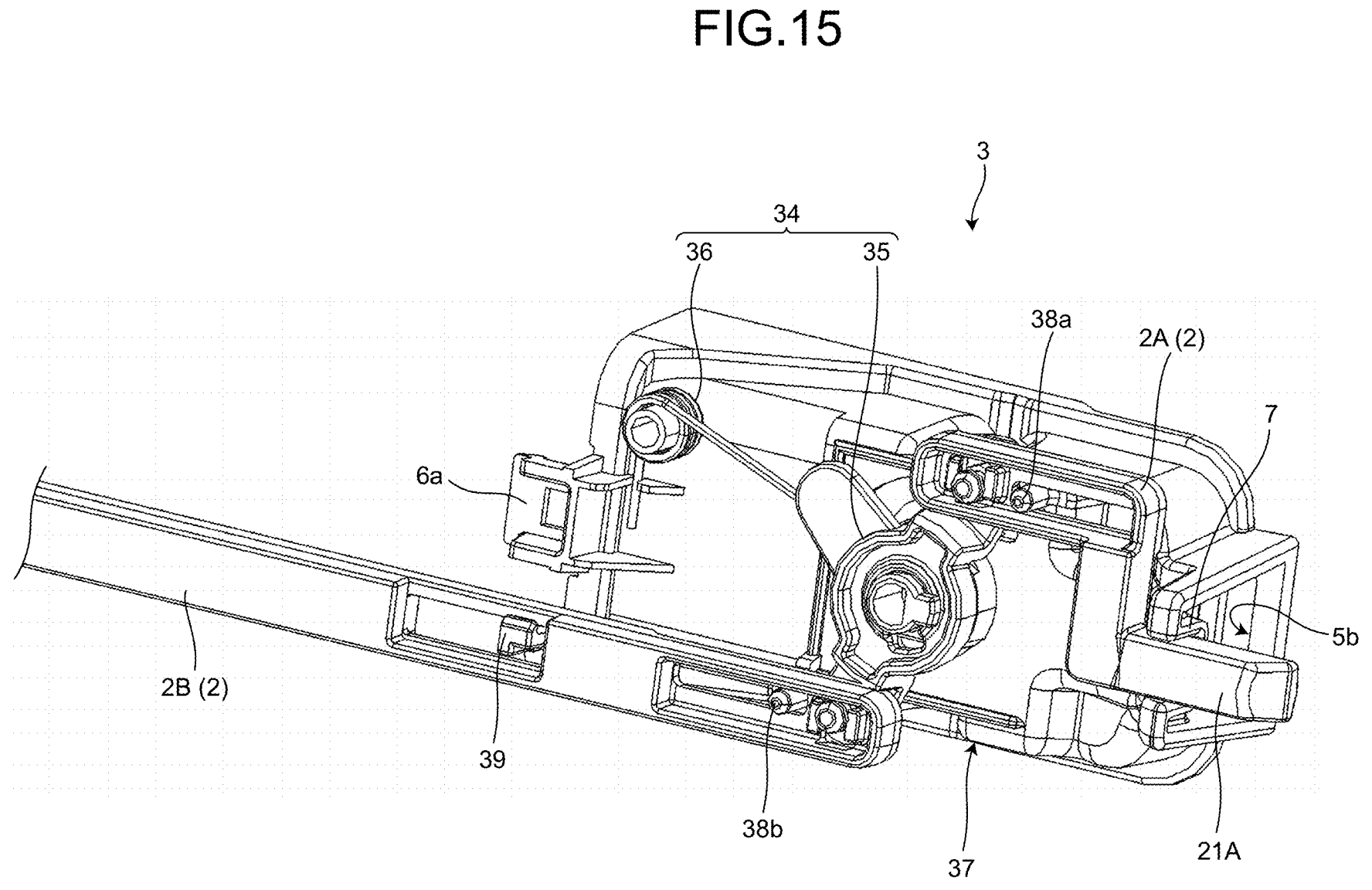

The structure of the lock mechanism 3 will be described in detail. FIG. 12 is a perspective view illustrating a structure example of the lock mechanism according to the embodiment of the disclosure. FIG. 12 is a diagram illustrating the lock mechanism 3 as viewed from the interlocking unit side. FIG. 13 is a perspective view of the lock mechanism illustrated in FIG. 12 as viewed from the operation unit side. FIG. 14 is an exploded view of the lock mechanism illustrated in FIG. 12. FIG. 15 is a perspective view illustrating a state in which the lock unit is assembled to the lock mechanism illustrated in FIG. 12.

The lock mechanism 3 allows the lock unit 2, which locks the closed state of the outer unit 1 described above in a releasable manner, to operate in accordance with a user's operation. As illustrated in FIGS. 12 to 15, the lock mechanism 3 includes an operation unit 31, an interlocking unit 34, and the base unit 37. Hereinafter, structures of the operation unit 31, the interlocking unit 34, and the base unit 37 of the lock mechanism 3 will be described in detail.

Structure of Operation Unit

Figure 16:
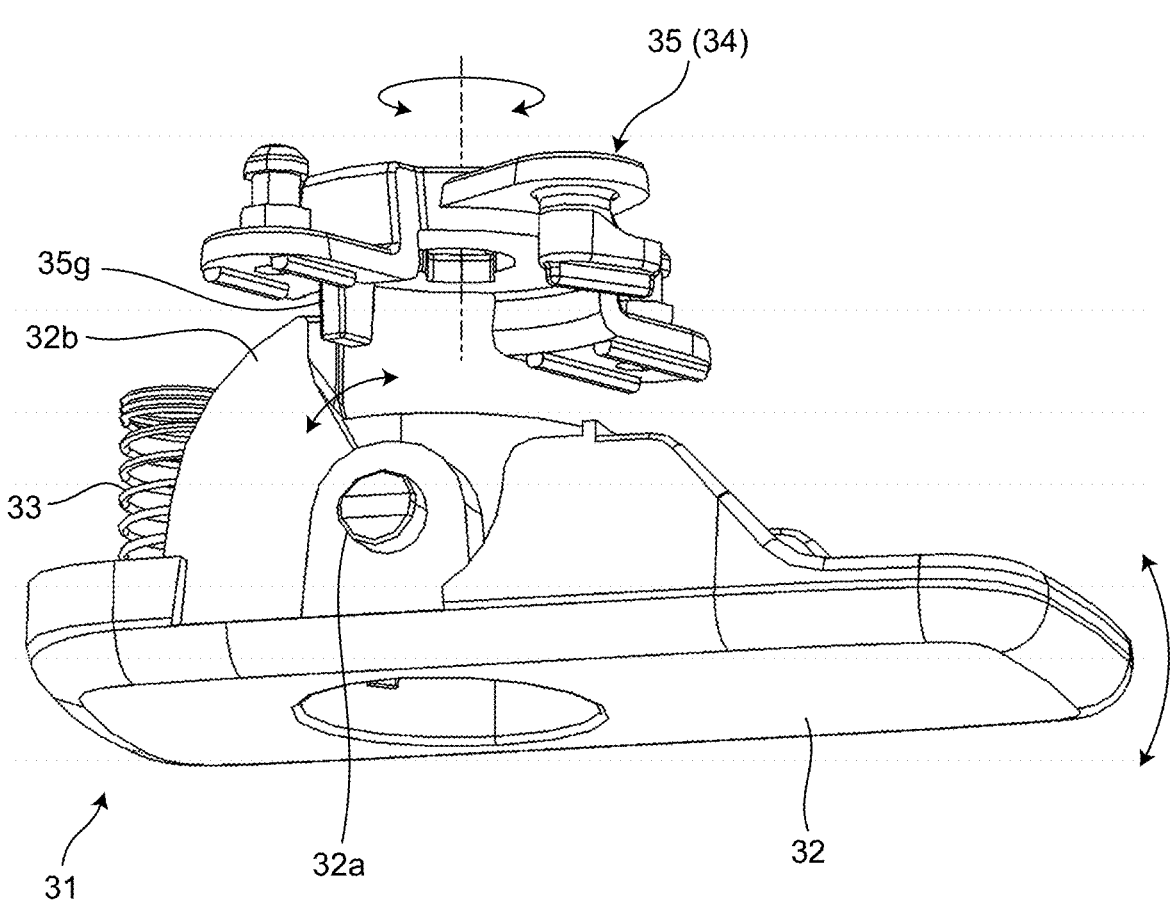
FIG. 16 is a diagram illustrating a structure example of the operation unit of the lock mechanism of the embodiment of the disclosure.

The structure of the operation unit 31 will be described in detail. FIG. 16 is a diagram illustrating a structure example of the operation unit of the lock mechanism of the embodiment of the disclosure. The operation unit 31 is for unlocking the closed state of the outer unit 1. Specifically, as illustrated in FIGS. 13, 14, and 16, the operation unit 31 includes a knob 32 to be operated by a user and a spring 33 that applies a biasing force to the knob 32.

The knob 32 is for performing operation of unlocking the closed state of the outer unit 1. As illustrated in FIG. 16, the knob 32 includes a turning shaft 32a and an action portion 32b. The knob 32 is freely turnably assembled to the base unit 37 by the turning shaft 32a pivotally supported by the base unit 37 (see FIGS. 13 and 14). When the knob 32 is assembled to the base unit 37, the action portion 32b of the knob 32 is disposed inside the base unit 37 having a recessed shape. Specifically, as illustrated in FIG. 16, the action portion 32b faces a protrusion 35g of a link unit 35 of the interlocking unit 34 assembled to the base unit 37. The knob 32 turns about the turning shaft 32a in response to the user's operation and pushes the protrusion 35g of the link unit 35 by the action portion 32b. As a result, the knob 32 operates (turns) the link unit 35.

As illustrated in FIGS. 13 and 14, the spring 33 is interposed between the inside of the base unit 37 and the back side of the knob 32. The spring 33 is always in a contracted state from an equilibrium length and applies a biasing force in a direction to bring the knob 32 into an initial state before turning. When the knob 32 turns as illustrated in FIG. 16, the spring 33 returns the turned knob 32 to the initial state by the biasing force.

Structure of Interlocking Unit

Figure 17:
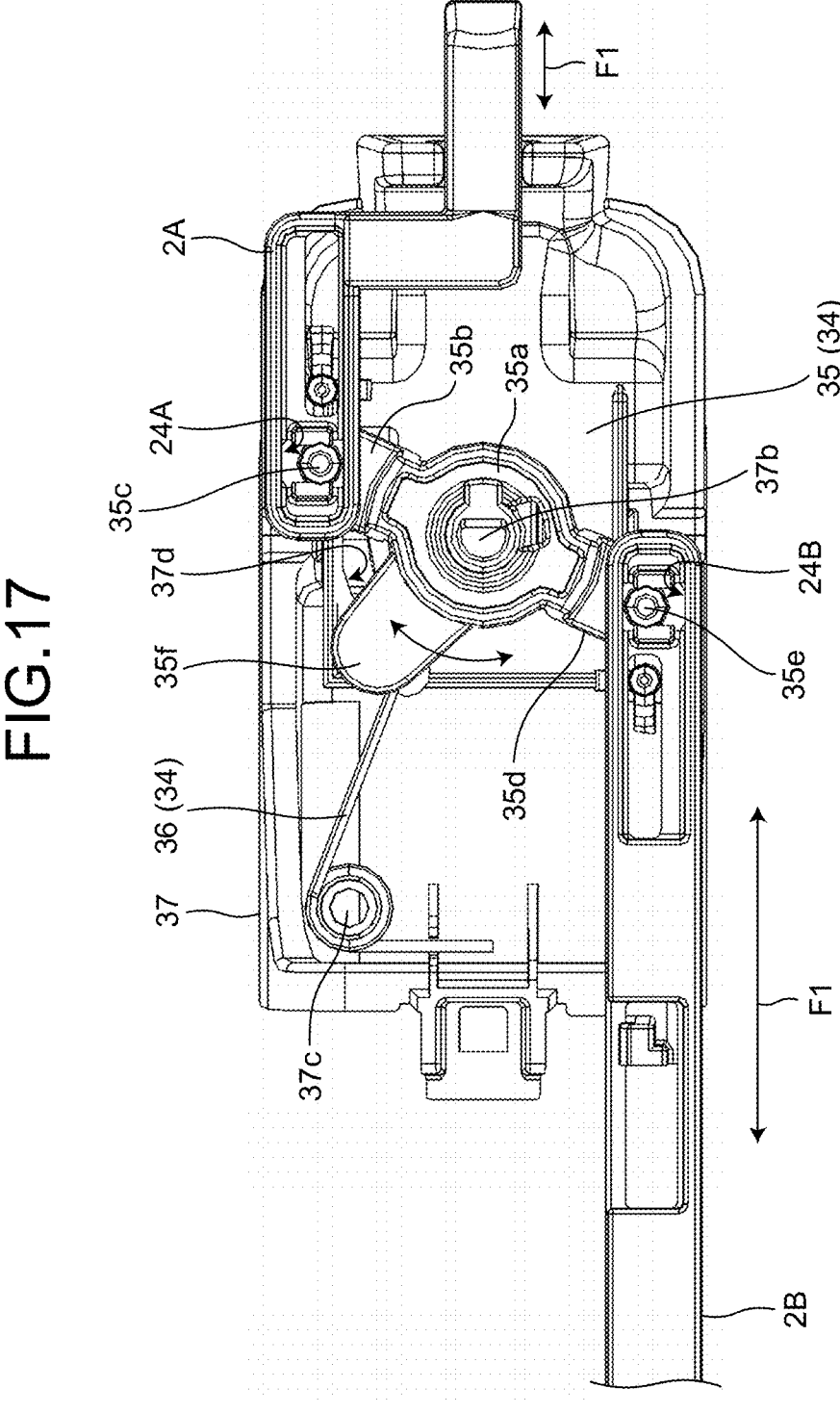
FIG. 17 is a diagram illustrating a structure example of an interlocking unit of the lock mechanism of the embodiment of the disclosure.

The structure of the interlocking unit 34 will be described in detail. FIG. 17 is a diagram illustrating a structure example of the interlocking unit of the lock mechanism of the embodiment of the disclosure. The interlocking unit 34 interlocks the operation unit 31 and the lock unit 2 (specifically, the first rod 2A and the second rod 2B). Specifically, as illustrated in FIGS. 12 to 15 and 17, the interlocking unit 34 includes the link unit 35 that operates the lock unit 2 in response to the operation of the operation unit 31 and a spring 36 that applies a biasing force to the link unit 35.

The link unit 35 is pivotally supported by the base unit 37 in a freely turnable manner and converts the turning of the link unit 35 into reciprocating operation in the longitudinal direction F1 of the lock unit 2. Specifically, as illustrated in FIG. 17, the link unit 35 includes a turning shaft portion 35a, a first arm 35b, a first fitting pin 35c, a second arm 35d, a second fitting pin 35e, and a third arm 35f. As illustrated in FIG. 16, the link unit 35 also includes the protrusion 35g.

The turning shaft portion 35a serves as a central axis of turning of the link unit 35. As illustrated in FIG. 17, the turning shaft portion 35a is pivotally supported by a shaft support portion 37a of the base unit 37 in a freely turnable manner. As a result, the link unit 35 is assembled to the base unit 37 in a freely turnable manner.

The first arm 35b converts the turning of the link unit 35 into reciprocating motion in the longitudinal direction F1 of the first rod 2A. Specifically, as illustrated in FIG. 17, the first arm 35b is formed to extend in the radial direction of the turning of the link unit 35 from the turning shaft portion 35a. The first fitting pin 35c is erected on a surface of the first arm 35b. The first fitting pin 35c is one of the fitting pins to be fitted to the lock unit 2. Specifically, as illustrated in FIG. 17, the first fitting pin 35c is fitted into the fitting hole 24A of the first rod 2A. For example, a fitting direction of the first fitting pin 35c and the fitting hole 24A is the same linear direction as the fitting direction of the turning shaft portion 35a of the link unit 35 and a turning shaft portion 37b of the base unit 37.

As illustrated in FIG. 16, on a back surface of the first arm 35b, there is provided a protrusion 35g that comes into contact with the action portion 32b of the knob 32 described above. The protrusion 35g is inserted into an insertion hole 37d formed in the base unit 37 and is disposed in the vicinity of the action portion 32b.

The second arm 35d converts the turning of the link unit 35 into reciprocating motion in the longitudinal direction F1 of the second rod 2B. Specifically, as illustrated in FIG. 17, the second arm 35d is formed in such a manner as to extend from the turning shaft portion 35a in the radial direction of the turning of the link unit 35 (for example, a direction opposite to the first arm 35b). The second fitting pin 35e is erected on a surface of the second arm 35d. The second fitting pin 35e is one of the fitting pins to be fitted to the lock unit 2. Specifically, as illustrated in FIG. 17, the second fitting pin 35e is fitted into the fitting hole 24B of the second rod 2B. For example, the fitting direction of the second fitting pin 35e and the fitting hole 24B is the same linear direction as the fitting direction of the first fitting pin 35c and the fitting hole 24A described above.

As illustrated in FIG. 17, the third arm 35f is formed to extend from the turning shaft portion 35a in the radial direction of the turning of the link unit 35 and in a direction different from those of the first arm 35b and the second arm 35d described above. The third arm 35f comes into contact with an extending portion of the spring 36 assembled to the base unit 37 and receives the biasing force of the spring 36 via the extending portion.

As illustrated in FIG. 17, the spring 36 is assembled to a spring pin 37c of the base unit 37. As illustrated in FIG. 17, the spring 36 has two extending portions. One of these two extending portions is in contact with the third arm 35f of the link unit 35 described above. The other extending portion is fitted into a predetermined portion of the base unit 37. The spring 36 always applies a biasing force to the third arm 35f via the extending portions in a direction to bring the link unit 35 into the initial state before turning. The link unit 35 turns in conjunction with the turning of the knob 32 and then returns to the initial state before the turning by the biasing force of the spring 36.

The interlocking unit 34 having the structure described above turns the link unit 35 about the turning shaft portion 35a in a predetermined direction (counterclockwise direction in FIG. 17) in response to the turning of the knob 32. As a result, the interlocking unit 34 moves the first rod 2A and the second rod 2B in mutually opposite directions in the longitudinal direction F1 in such a manner that the protruding and retracting portions 21A and 21B are retracted into the inside of the inner unit 4. As a result, the lock of the closed state of the outer unit 1 is released. Then, the interlocking unit 34 turns the link unit 35 in a direction opposite to the predetermined direction (clockwise direction in FIG. 17) about the turning shaft portion 35a by the biasing force of the spring 36. As a result, the interlocking unit 34 moves the first rod 2A and the second rod 2B in mutually opposite directions in the longitudinal direction F1 in such a manner that the protruding and retracting portions 21A and 21B each protrude to the outside of the inner unit 4.

Structure of Base Unit

Figure 18:
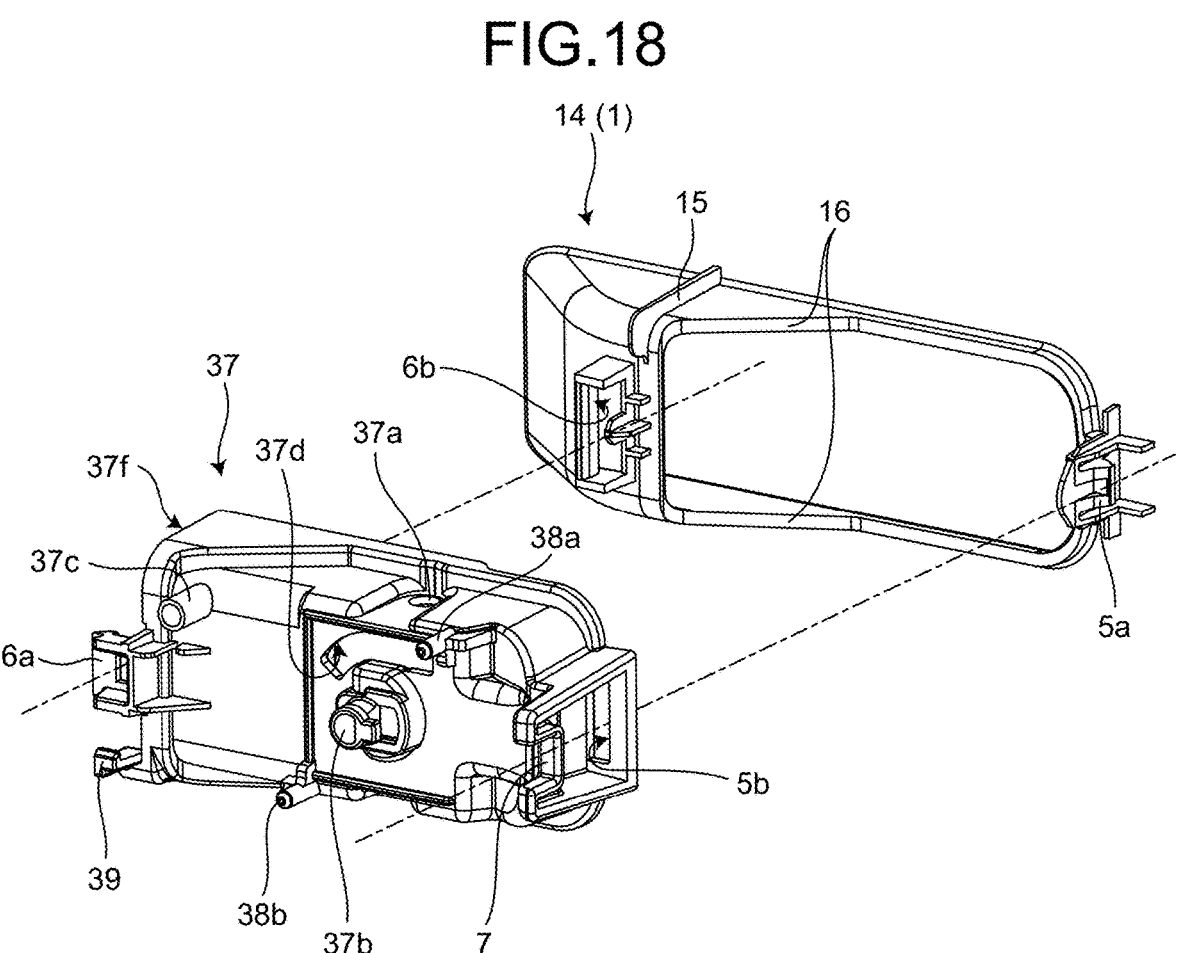
FIG. 18 is a perspective view illustrating a structure example of a base unit of the lock mechanism of the embodiment of the disclosure.
Figure 19:
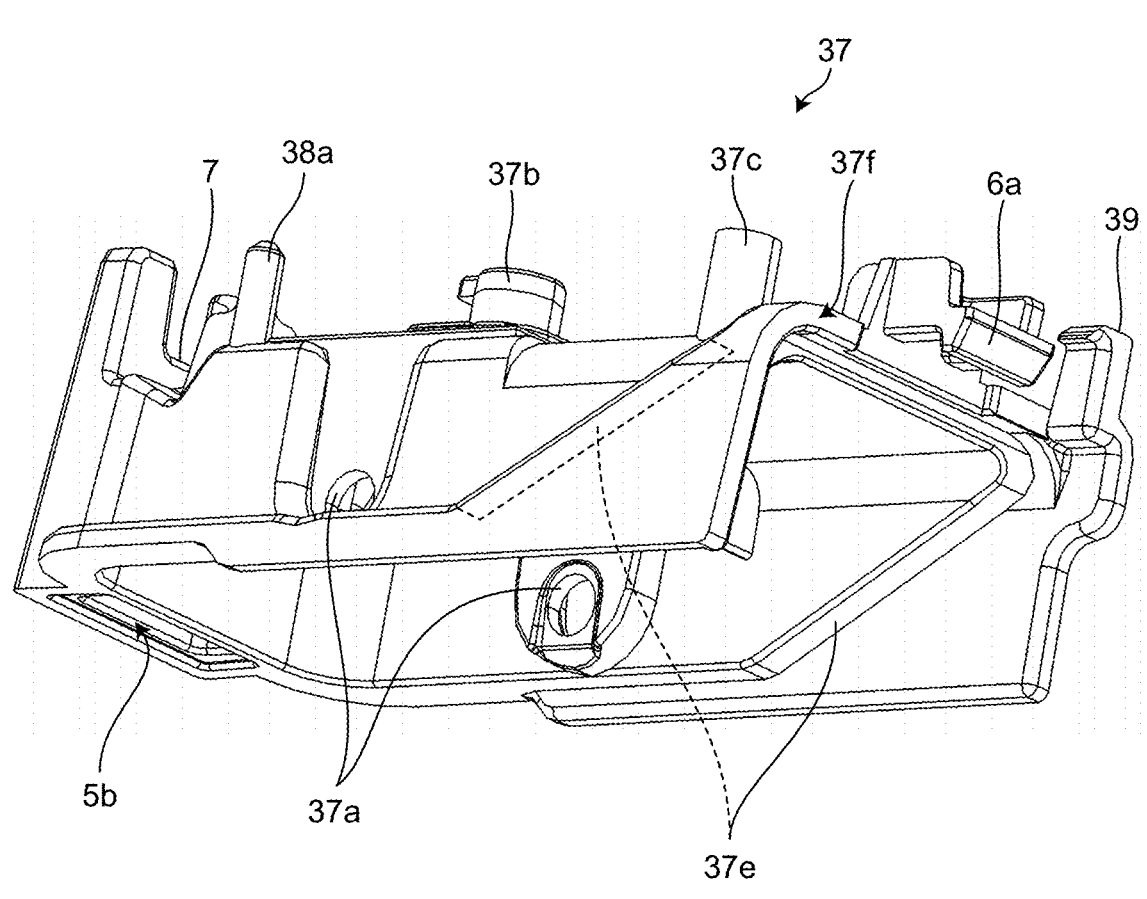
FIG. 19 is a perspective view illustrating an example of an inner structure of the base unit illustrated in FIG. 18.

The structure of the base unit 37 will be described in detail. FIG. 18 is a perspective view illustrating a structure example of the base unit of the lock mechanism of the embodiment of the disclosure. FIG. 19 is a perspective view illustrating an example of the inner structure of the base unit illustrated in FIG. 18. The base unit 37 is a structure in which the operation unit 31 and the interlocking unit 34 described above are provided. Specifically, the base unit 37 is a structure formed in a recessed shape (see FIG. 13) pivotally supporting and enclosing the knob 32 of the operation unit 31 described above in a freely turnable manner and includes a fitting hole 5b, a fitting claw 6a, and a receiving seat portion 7 as illustrated in FIG. 18.

For example, as illustrated in FIGS. 18 and 19, the fitting hole 5b is included at an end of the base unit 37 on a side opposite to an open end (end 37f). The fitting hole 5b is fitted with the fitting claw 5*a* of the outer unit 1 when the base unit 37 is assembled to the protruding portion 14 of the outer unit 1. For example, as illustrated in FIGS. 18 and 19, the fitting claw 6*a* is provided at an upper portion of the base unit 37 on the end 37*f* side. The fitting claw 6*a* is fitted with the fitting hole 6*b* of the protruding portion 14 when the base unit 37 is assembled to the protruding portion 14 of the outer unit 1.

The receiving seat portion 7 is an example of a receiving seat portion that receives the lock unit 2. Specifically, as illustrated in FIGS. 18 and 19, the receiving seat portion 7 is formed in a recessed shape that opens in the same linear direction as the fitting directions of the fitting pins of the link unit 35 and the fitting holes of the lock unit 2 described above and is provided, for example, at an end of the base unit 37 on a side opposite to the end 37*f*. Here, examples of the fitting pins of the link unit 35 include the first fitting pin 35*c* and the second fitting pin 35*e* (see FIG. 17) described above. Examples of the fitting holes of the lock unit 2 include the fitting hole 24A of the first rod 2A and the fitting hole 24B of the second rod 2B. In addition, the receiving seat portion 7 preferably opens in the same direction as the recessed shape of the receiving seat portion 8 (see FIGS. 3 and 5) that receives the second rod 2B. The receiving seat portion 7 receives the first rod 2A which is the shorter one of the pair of long and short rods of the lock unit 2 (see FIG. 3) assembled to the lock mechanism 3. More specifically, the receiving seat portion 7 receives the distal end (the protruding and retracting portion 21A illustrated in FIG. 15 and others) of the first rod 2A in a state where the distal end can reciprocate in the longitudinal direction F1 thereof.

As illustrated in FIGS. 18 and 19, the base unit 37 further includes the shaft support portions 37*a*, the turning shaft portion 37*b*, the spring pin 37*c*, the insertion hole 37*d*, second engagement portions 37*e*, regulation pins 38*a* and 38*b*, and a claw portion 39.

The shaft support portions 37*a* are through holes for pivotally supporting the knob 32 of the operation unit 31 in a freely rotatable manner and are formed in respective side walls of the base unit 37 having the recessed shape as illustrated in FIGS. 18 and 19. The turning shaft 32*a* (see FIG. 16) of the knob 32 is freely turnably fitted into the shaft support portions 37*a*. The turning shaft portion 37*b* is a pin-shaped structure fitted to the turning shaft portion 35*a* of the link unit 35 and is erected on the upper part of the base unit 37 as illustrated in FIGS. 18 and 19. The turning shaft portion 37*b* is fitted into a through hole formed at the center of turning of the turning shaft portion 35*a* of the link unit 35. A fitting direction between the turning shaft portions 35*a* and 37*b* is preferably the same linear direction as the fitting direction between the fitting pins of the link unit 35 and the fitting holes of the lock unit 2.

The spring pin 37*c* is a pin for assembling the spring 36 (see FIG. 17) of the interlocking unit 34 described above. As illustrated in FIGS. 18 and 19, the spring pin 37*c* is erected on the upper portion of the base unit 37. The insertion hole 37*d* is a through hole through which the protrusion 35*g* (see FIG. 16) of the link unit 35 is inserted. For example, as illustrated in FIG. 18, the insertion hole 37*d* is formed along the turning locus of the third arm 35*f* of the link unit 35.

The second engagement portions 37*e* are engaged with the first engagement portions 16 formed on the protruding portion 14 of the outer unit 1 to form the parting line between the base unit 37 and the protruding portion 14. Specifically, as illustrated in FIG. 19, the second engagement portions 37*e* are formed on the inner wall surface of the base unit 37 in such a manner as to have an inclined shape descending from the upper side to the lower side (recessed opening side) of the base unit 37. That is, the second engagement portions 37*e* have inclined shapes that can be engaged with the first engagement portions 16. When the base unit 37 is assembled to the protruding portion 14 of the outer unit 1, the second engagement portions 37*e* as the above are engaged with the first engagement portions 16 of the protruding portion 14, thereby forming the parting line between the base unit 37 and the protruding portion 14.

The regulation pins 38*a* and 38*b* regulate the motion direction of the lock unit 2 accompanying the operation of the interlocking unit 34 in the longitudinal direction F1 of the lock unit 2. Specifically, as illustrated in FIG. 18, the regulation pin 38*a* is erected in a region where the proximal end 22A of the first rod 2A is disposed in the base unit 37. The regulation pin 38*a* is inserted into the regulation hole 25A (see FIG. 8) formed in the proximal end 22A of the first rod 2A. The insertion direction of the regulation pin 38*a* into the regulation hole 25A is preferably the same linear direction as the fitting direction of the first fitting pin 35*c* of the link unit 35 and the fitting hole 24A of the first rod 2A. The regulation pin 38*a* is in relatively sliding contact with the regulation hole 25A, thereby regulating the motion direction of the first rod 2A in the longitudinal direction of the regulation hole 25A, namely, the longitudinal direction F1 of the first rod 2A.

As illustrated in FIG. 18, the regulation pin 38*b* is erected in a region where the proximal end 22B of the second rod 2B is disposed in the base unit 37. The regulation pin 38*b* is inserted into the regulation hole 25B (see FIG. 11) formed in the proximal end 22B of the second rod 2B. The insertion direction of the regulation pin 38*b* into the regulation hole 25B is preferably the same linear direction as the fitting direction of the second fitting pin 35*e* of the link unit 35 and the fitting hole 24B of the second rod 2B. The regulation pin 38*b* is in relatively sliding contact with the regulation hole 25B, thereby regulating the motion direction of the second rod 2B in the longitudinal direction of the regulation hole 25B, namely, the longitudinal direction F1 of the second rod 2B.

The claw portion 39 suppresses swinging of the lock unit 2 in a state of being fitted to the fitting pin of the interlocking unit 34, more specifically, swinging of the second rod 2B with the fitting hole 24B fitted to the second fitting pin 35*e* of the link unit 35. As illustrated in FIGS. 18 and 19, the claw portion 39 is a structure in which a tip portion protrudes in a hook shape and is provided in the vicinity of the end 37*f* of the base unit 37 and in a region where the proximal end 22B of the second rod 2B is disposed. When the second rod 2B is assembled to the link unit 35, the claw portion 39 is fitted into the claw hole 26B of the proximal end 22B of the second rod 2B in a slidable manner. The claw portion 39 overlaps with the edge 29B of the claw hole 26B, thereby suppressing swinging of the second rod 2B (for example, swinging in the width direction F2 about the second fitting pin 35*e*). The fitting direction of the claw portion 39 and the claw hole 26B is preferably the same linear direction as the fitting direction of the second fitting pin 35*e* of the link unit 35 and the fitting hole 24B of the second rod 2B.

Figure 20:
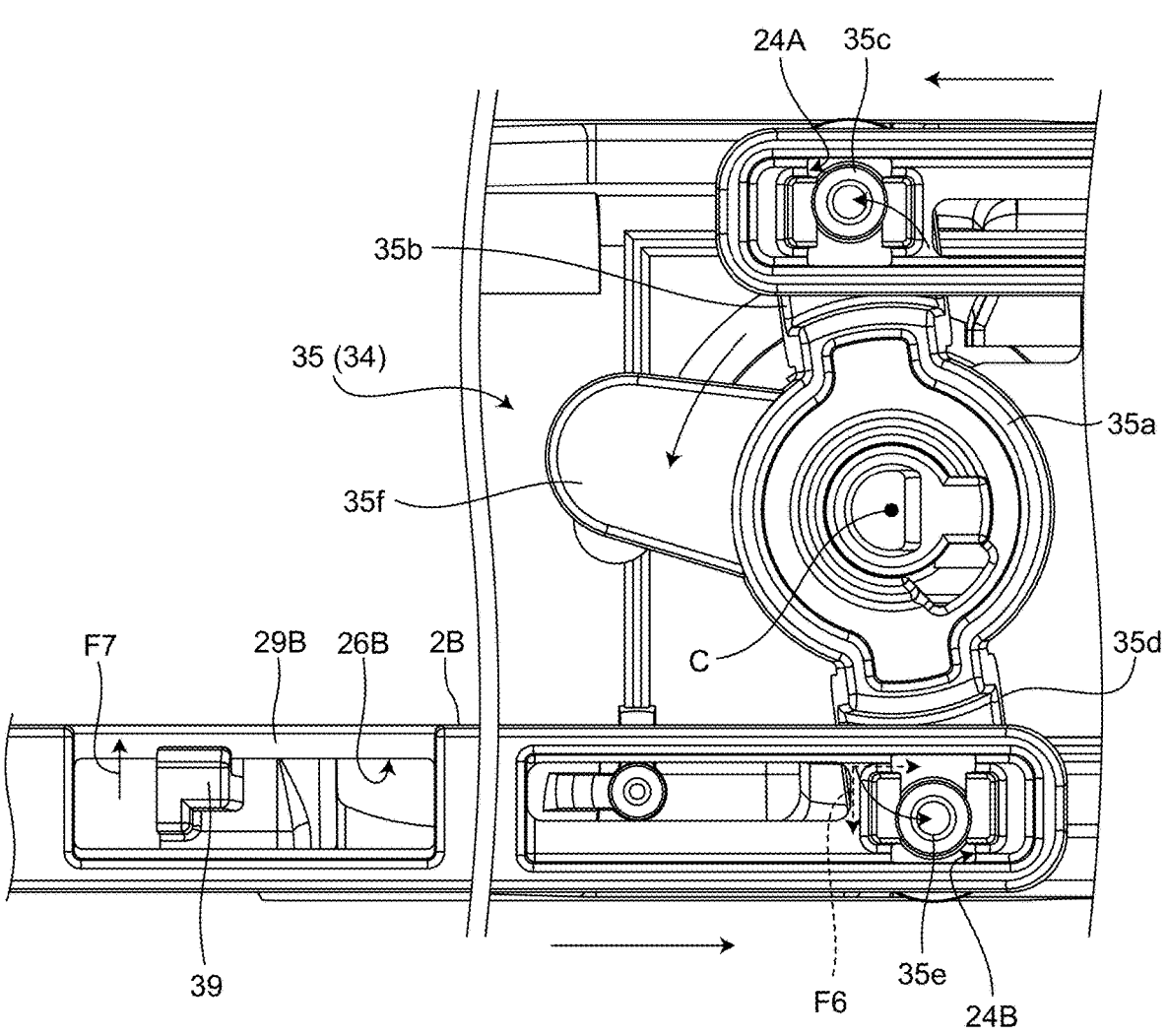
FIG. 20 is a diagram illustrating a state in which a claw portion and an edge of a claw hole overlap each other in order to suppress swinging of the second rod.

FIG. 20 is a diagram illustrating a state in which the claw portion and the edge of the claw hole overlap each other in order to suppress swinging of the second rod. As illustrated in FIG. 20, the claw portion 39 protrudes in a direction (specific direction F7) opposite to a release direction F6 of the second fitting pin 35*e* in the fitting hole 24B of the second rod 2B and overlaps the edge 29B of the claw hole 26B.

Here, as illustrated in FIG. 20, the second fitting pin 35*e* fitted into the fitting hole 24B of the second rod 2B turns together with the second arm 35*d* as the link unit 35 turns. At this point, the second fitting pin 35*e* moves in the longitudinal direction of the second rod 2B along with the fitting hole 24B while moving in a direction from the turning center C of the interlocking unit 34 (link unit 35) toward the outer side in the longitudinal direction of the fitting hole 24B inside the fitting hole 24B. As described above, the direction in which the second fitting pin 35*e* moves from the turning center C to the outer side in the longitudinal direction of the fitting hole 24B during turning is the release direction F6. In a case where the claw portion 39 has a shape protruding in the specific direction F7 and is fitted into the claw hole 26B as described above, even if the second rod 2B is about to swing, the claw portion is always kept overlapped with the edge 29B and engages with the claw hole 26B against the swing of the second rod 2B. Accordingly, the claw portion 39 can suppress swinging of the second rod 2B.

Structure of Inner Unit

Figure 21:
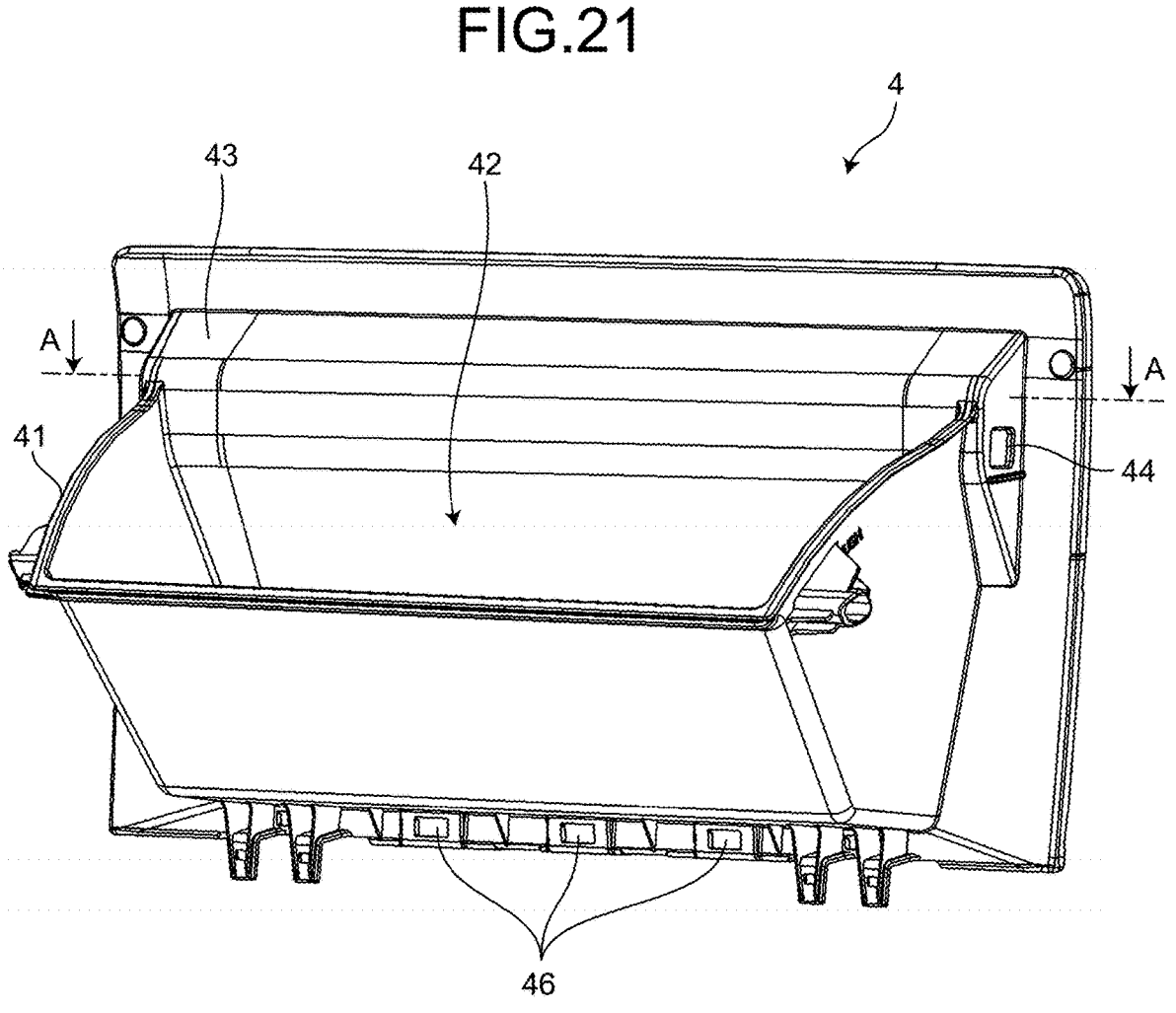
FIG. 21 is a perspective view illustrating a structure example of the inner unit of the glove box of the embodiment of the disclosure.
Figure 22:
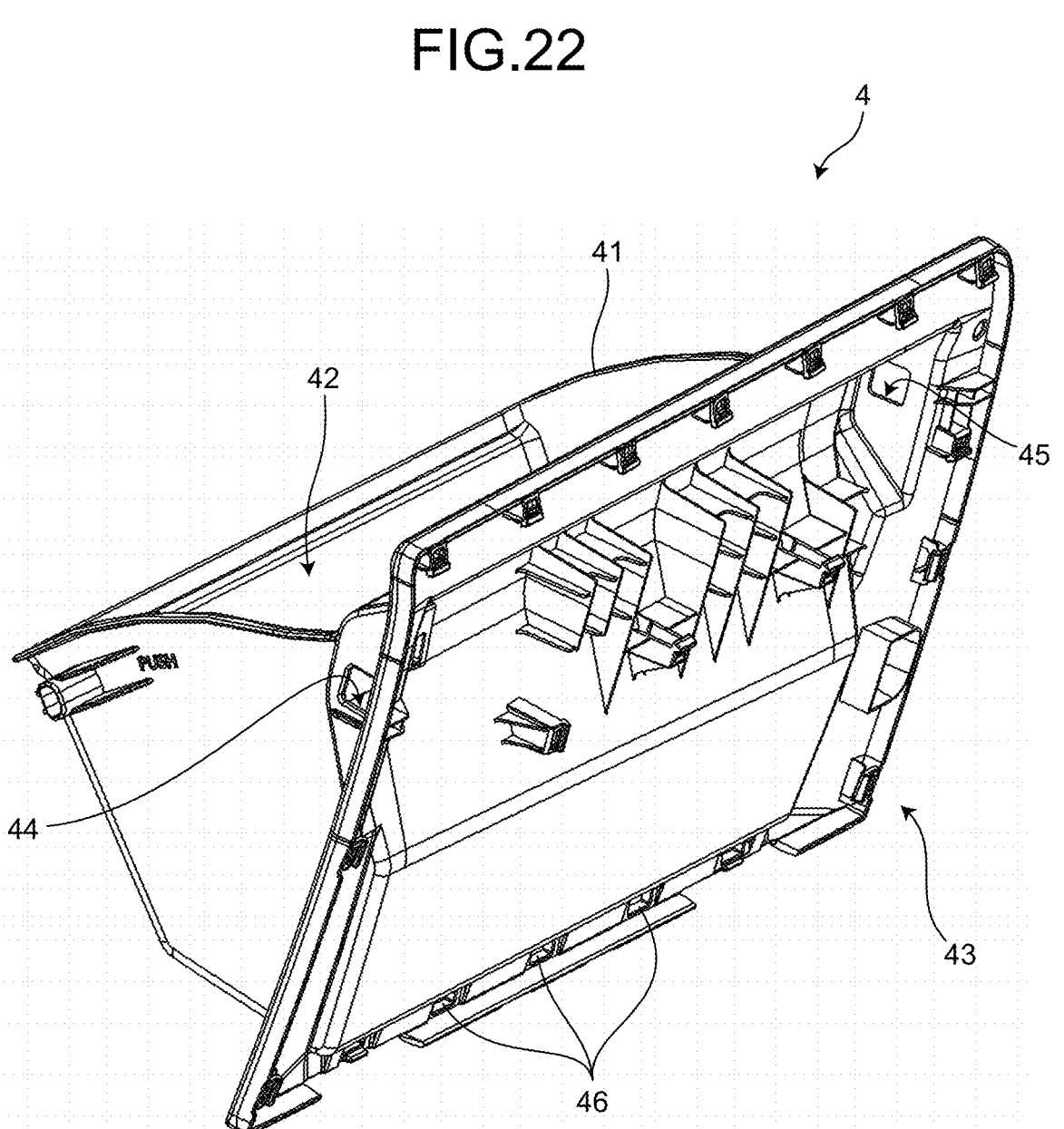
FIG. 22 is a perspective view illustrating an example of the internal structure of the inner unit illustrated in FIG. 21.
Figure 23:
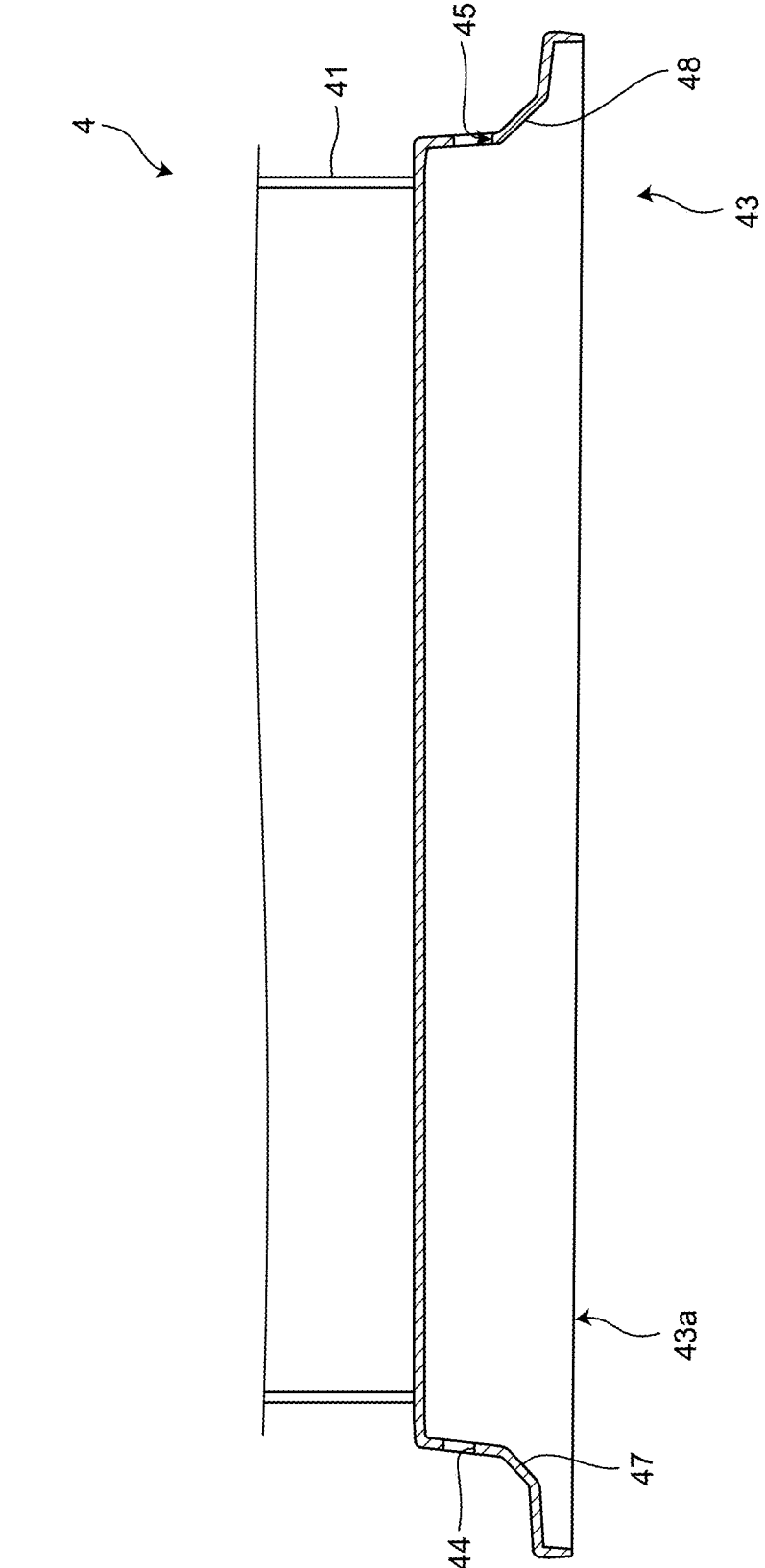
FIG. 23 is a schematic cross-sectional view taken along line A-A of the inner unit illustrated in FIG. 21.

The structure of the inner unit 4 will be described in detail. FIG. 21 is a perspective view illustrating a structure example of the inner unit of the glove box of the embodiment of the disclosure. FIG. 22 is a perspective view illustrating an example of the internal structure of the inner unit illustrated in FIG. 21. FIG. 23 is a schematic cross-sectional view taken along line A-A of the inner unit illustrated in FIG. 21. The inner unit 4 has an article storing function of the glove box 10 and closes the inner wall 12 of the outer unit 1 to which the lock unit 2 and the lock mechanism 3 are assembled in a state where the lock unit 2 can protrude and retract. Specifically, as illustrated in FIGS. 21 to 23, the inner unit 4 includes an article storage unit 41, an enclosure unit 43, and fitting holes 46. The inner unit 4 has protruding and retracting ports 44 and 45 and inclined portions 47 and 48 on side walls of the enclosure unit 43.

As illustrated in FIGS. 21 and 22, the article storage unit 41 is a bottomed structure opened to the upper side and is integrally formed with the enclosure unit 43 in such a manner as to extend from the outer wall of the enclosure unit 43 to the back surface side of the inner unit 4 (the side opposite to the assembling side of the outer unit 1). The article storage unit 41 forms a storage space 42, for storing articles so that the articles can be taken in and out, between the article storage unit 41 and the outer wall of the enclosure unit 43.

The enclosure unit 43 encloses the lock unit 2 and the lock mechanism 3 between the enclosure unit 43 and the inner wall 12 of the outer unit 1. Specifically, as illustrated in FIGS. 21 and 22, the enclosure unit 43 is formed in a lid shape that has an internal space to enclose components and to close the inner wall 12 (see FIG. 3) of the outer unit 1. A part of the enclosure unit 43 is formed in a recessed shape to have the internal space to enclose the lock unit 2 and the lock mechanism 3 assembled to the inner wall 12 of the outer unit 1. The enclosure unit 43 is assembled to the outer unit 1 in such a manner as to operably enclose the lock unit 2 and the lock mechanism 3 with the inner wall 12 of the outer unit 1 and to close the inner wall 12. For example, as illustrated in FIGS. 21 and 22, a plurality of fitting holes 46 is formed in the enclosure unit 43. When the inner unit 4 is assembled to the outer unit 1, the fitting claws 17 (see FIG. 5) of the outer unit 1 is fitted into the respective fitting holes 46. Note that the fitting direction of the plurality of fitting holes 46 and the fitting claws 17 is preferably the same linear direction as the fitting direction of the fitting portions 5 and 6 when the lock mechanism 3 is assembled to the inner wall 12 of the outer unit 1.

Meanwhile, as illustrated in FIGS. 21 to 23, the enclosure unit 43 has the protruding and retracting ports 44 and 45 and the inclined portions 47 and 48. Each of the protruding and retracting ports 44 and 45 is a through hole through which the lock unit 2 can protrude and retract. Specifically, as illustrated in FIGS. 22 and 23, the protruding and retracting ports 44 and 45 are formed in respective side walls, of the enclosure unit 43, on both sides facing each other. One of the protruding and retracting ports, namely, the protruding and retracting port 44, is a through hole through which the protruding and retracting portion 21A of the first rod 2A protrudes and retracts. The other protruding and retracting port 45 is a through hole through which the protruding and retracting portion 21B of the second rod 2B protrudes and retracts.

The inclined portions 47 and 48 move the respective distal ends of the lock unit 2 in the longitudinal direction toward the inside of the inner unit 4 when the inner unit 4 is assembled to the outer unit 1. Specifically, as illustrated in FIG. 23, the inclined portion 47 is formed on one of the side walls, of the enclosure unit 43, on both sides facing each other. More specifically, the inclined portion 47 is formed between an open end 43*a* of the enclosure unit 43 and the protruding and retracting port 44. As illustrated in FIG. 23, the inclined portion 47 is inclined to the inside of the inner unit 4 from the open end 43*a* side of the enclosure unit 43 toward the protruding and retracting port 44. Such an inclined portion 47 comes into sliding contact with the protruding and retracting portion 21A of the first rod 2A at the time of assembling the outer unit 1 and the inner unit 4 and moves the protruding and retracting portion 21A toward the inside of the inner unit 4 as the assembling proceeds.

As illustrated in FIG. 23, the inclined portion 48 is formed on the other side wall of the side walls, of the enclosure unit 43, on both sides facing each other. More specifically, the inclined portion 48 is formed between the open end 43*a* of the enclosure unit 43 and the protruding and retracting port 45. As illustrated in FIG. 23, the inclined portion 48 is inclined to the inside of the inner unit 4 from the open end 43*a* side of the enclosure unit 43 toward the protruding and retracting port 45. Such an inclined portion 48 comes into sliding contact with the protruding and retracting portion 21B of the second rod 2B at the time of assembling the outer unit 1 and the inner unit 4 and moves the protruding and retracting portion 21B toward the inside of the inner unit 4 as the assembling proceeds.

Note that the open end 43*a* of the enclosure unit 43 is an end on the assembling side of the enclosure unit 43 with respect to the outer unit 1. That is, the open end 43*a* side of the enclosure unit 43 means the same as the inner wall 12 side of the outer unit 1 to which the inner unit 4 is assembled.

Assembling Lock Unit and Lock Mechanism

Figure 24:
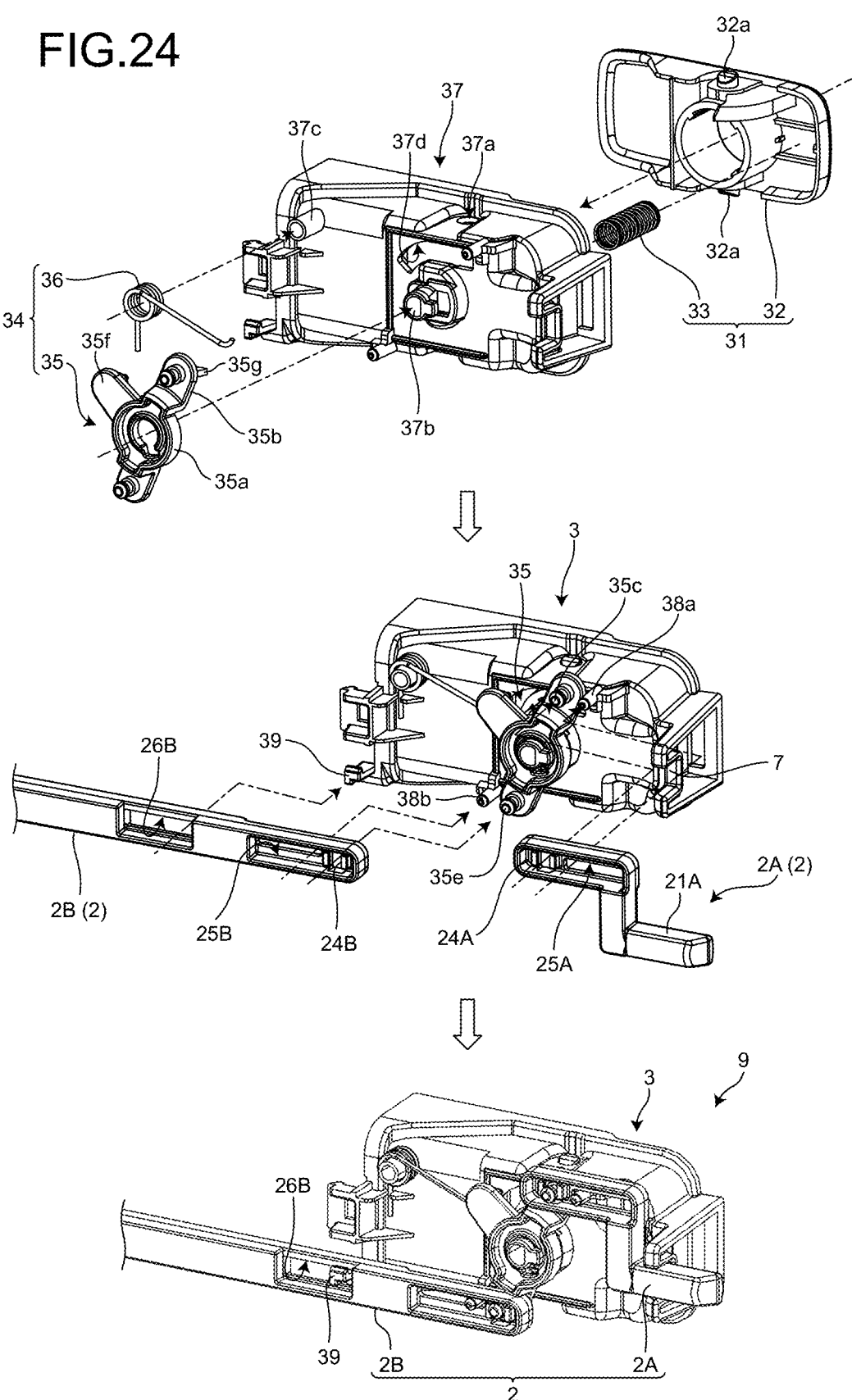
FIG. 24 is a diagram illustrating an example of assembling the lock unit and the lock mechanism of the embodiment of the disclosure.

The assembling of the lock unit 2 and the lock mechanism 3 will be described in detail. FIG. 24 is a diagram illustrating an example of assembling the lock unit and the lock mechanism of the embodiment of the disclosure. In assembling the lock unit 2 and the lock mechanism 3, first, assembling of the lock mechanism 3 will be described, and then assembling of the lock unit 2 to the lock mechanism 3 will be described.

As illustrated in FIG. 24, when the operation unit 31 is assembled to the base unit 37, the spring 33 is assembled to the inside of the base unit 37, and the knob 32 is assembled to the inside of the base unit 37 in such a manner as to sandwich the spring 33 between the base unit 37 and the knob 32. At this point, while pushing the knob 32 in the linear direction toward the inside of the base unit 37, the turning shaft 32*a* of the knob 32 is fitted into the shaft support portion 37*a* of the base unit 37.

Moreover, when the interlocking unit 34 is assembled to the base unit 37, the turning shaft portion 35*a* of the link unit 35 and the turning shaft portion 37*b* of the base unit 37 are fitted in such a manner that the protrusion 35*g* of the first arm 35*b* of the link unit 35 is inserted into the insertion hole 37*d* of the base unit 37. At this point, a fitting hole formed in a central portion of the turning shaft portion 35*a* of the link unit 35 is fitted to the turning shaft portion 37*b* of the base unit 37 in a linear direction (axial direction of the turning shaft portion 37*b*). Subsequently, the spring 36 is assembled to the spring pin 37*c* of the base unit 37, one of the extending portions of the spring 36 is fitted into a notch of the base unit 37, and the other extending portion is brought into contact with the third arm 35*f* of the link unit 35.

The lock mechanism 3 is assembled as described above. Note that, in assembling of the lock mechanism 3, the assembling order of the components of the operation unit 31 and the interlocking unit 34 is not particularly limited and may be a desired assembling order.

In a case where the lock unit 2 is assembled to the lock mechanism 3 assembled as described above, the first rod 2A and the second rod 2B are assembled to the link unit 35 of the lock mechanism 3 as illustrated in FIG. 24. For example, when the first rod 2A is assembled to the link unit 35, the fitting hole 24A of the first rod 2A and the first fitting pin 35*c* of the link unit 35 are fitted to each other while the regulation pin 38*a* is inserted into the regulation hole 25A of the first rod 2A, and at the same time, the protruding and retracting portion 21A of the first rod 2A is attached to the receiving seat portion 7. At this point, the insertion direction of the regulation hole 25A and the regulation pin 38*a*, the fitting direction of the fitting hole 24A and the first fitting pin 35*c*, and the attachment direction (insertion direction) of the protruding and retracting portion 21A and the receiving seat portion 7 are the same linear direction.

In addition, when the second rod 2B is assembled to the link unit 35, the fitting hole 24B of the second rod 2B and the second fitting pin 35*e* of the link unit 35 are fitted to each other, and the claw hole 26B of the second rod 2B and the claw portion 39 are fitted to each other while the regulation pin 38*b* is inserted into the regulation hole 25B of the second rod 2B. At this point, the insertion direction of the regulation hole 25B and the regulation pin 38*b*, the fitting direction of the fitting hole 24B and the second fitting pin 35*e*, and the fitting direction of the claw hole 26B and the claw portion 39 are the same linear direction. Furthermore, the assembling direction of the second rod 2B and the lock mechanism 3 is the same linear direction as the assembling direction of the first rod 2A and the lock mechanism 3.

As described above, assembling the lock unit 2 to the lock mechanism 3 is completed, and a lock assembly 9 is obtained as illustrated in FIG. 24. The lock assembly 9 is obtained by assembling the lock unit 2 to the lock mechanism 3. Note that, in assembling the lock unit 2 to the lock mechanism 3, the order of assembling the first rod 2A and the second rod 2B is not particularly limited and may be a desired assembling order.

Assembling Lock Assembly to Outer Unit

Figure 25:
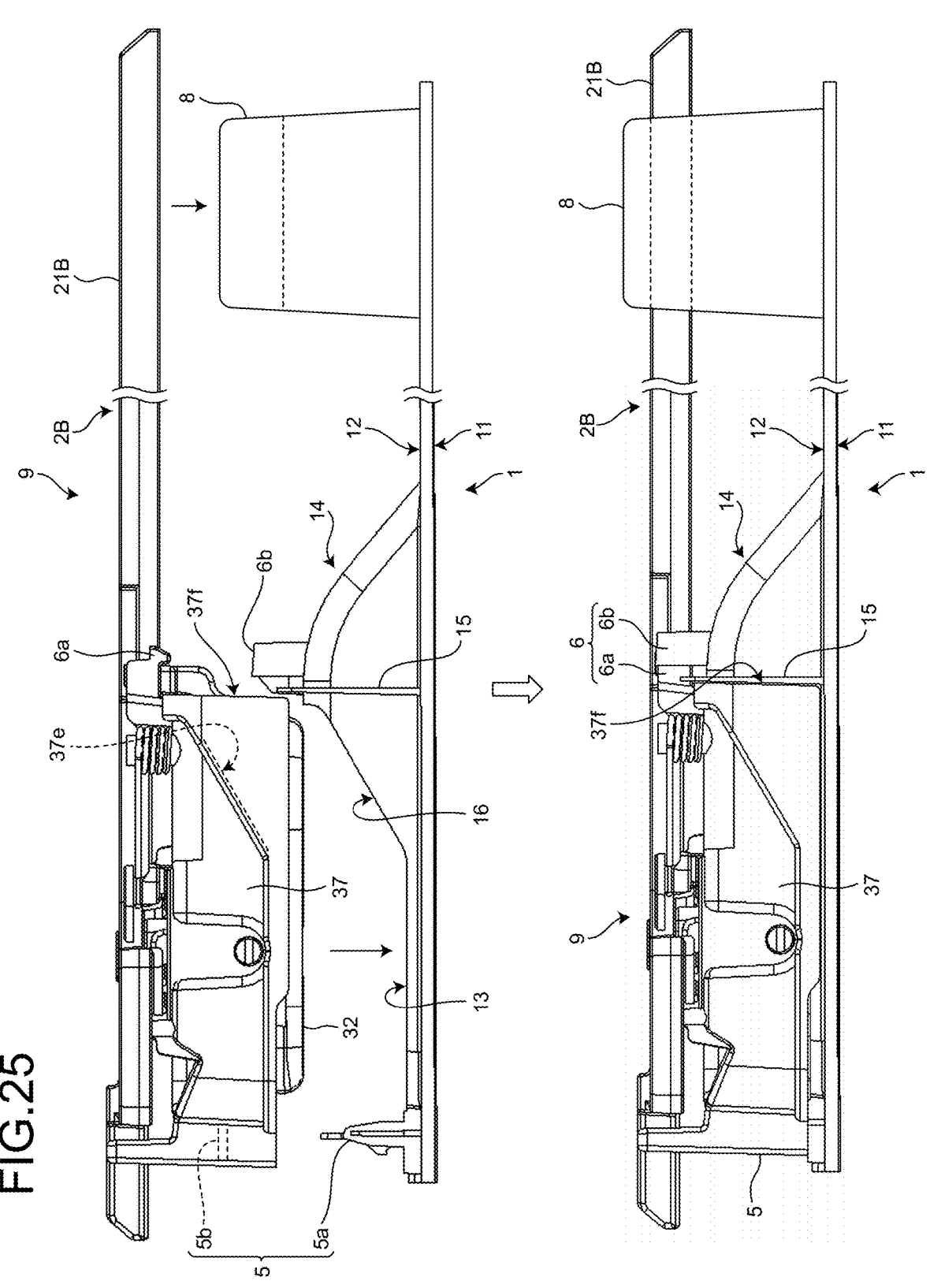
FIG. 25 is a diagram illustrating an example of assembling a lock assembly to the outer unit of the embodiment of the disclosure.

Assembling the lock assembly 9 to the outer unit 1 will be described in detail. FIG. 25 is a diagram illustrating an example of assembling the lock assembly to the outer unit of the embodiment of the disclosure. As illustrated in FIG. 25, the lock assembly 9 is assembled to the protruding portion 14 and the receiving seat portion 8 in such a manner as to cover the opening 13 from the inner wall 12 side of the outer unit 1.

Specifically, as illustrated in FIG. 25, the base unit 37 of the lock assembly 9 is brought close to the protruding portion 14 from the inner wall 12 side of the outer unit 1, and the end 37*f* of the base unit 37 is brought into contact with the guide portion 15 from the opening 13 side of the outer unit 1. Subsequently, the base unit 37 is brought close to the opening 13 and the protruding portion 14 while the end 37*f* of the base unit 37 is brought into sliding contact with the guide portion 15. The lower end of the base unit 37 and an edge of the opening 13 are joined, and the end 37*f* of the base unit 37 and the protruding portion 14 are joined while the joining position of the base unit 37 to the protruding portion 14 is regulated by the guide portion 15. At this point, while the fitting hole 5*b* of the base unit 37 and the fitting claw 5*a* of the outer unit 1 are fitted, the fitting claw 6*a* of the base unit 37 and the fitting hole 6*b* of the protruding portion 14 are fitted, and furthermore, the second engagement portion 37*e* of the base unit 37 and the first engagement portion 16 of the outer unit 1 are engaged. The fitting direction of the fitting claw 5*a* and the fitting hole 5*b*, the fitting direction of the fitting claw 6*a* and the fitting hole 6*b*, and the engagement direction of the first engagement portion 16 and the second engagement portion 37*e* are the same linear direction.

At the same time, as illustrated in FIG. 25, the protruding and retracting portion 21B of the second rod 2B of the lock assembly 9 is attached to the receiving seat portion 8 of the outer unit 1. At this point, the attachment direction (insertion direction) of the protruding and retracting portion 21B and the receiving seat portion 8 is the same linear direction as the fitting direction of the fitting claw 5*a* and the fitting hole 5*b* and the fitting direction of the fitting claw 6*a* and the fitting hole 6*b*.

Figure 26:
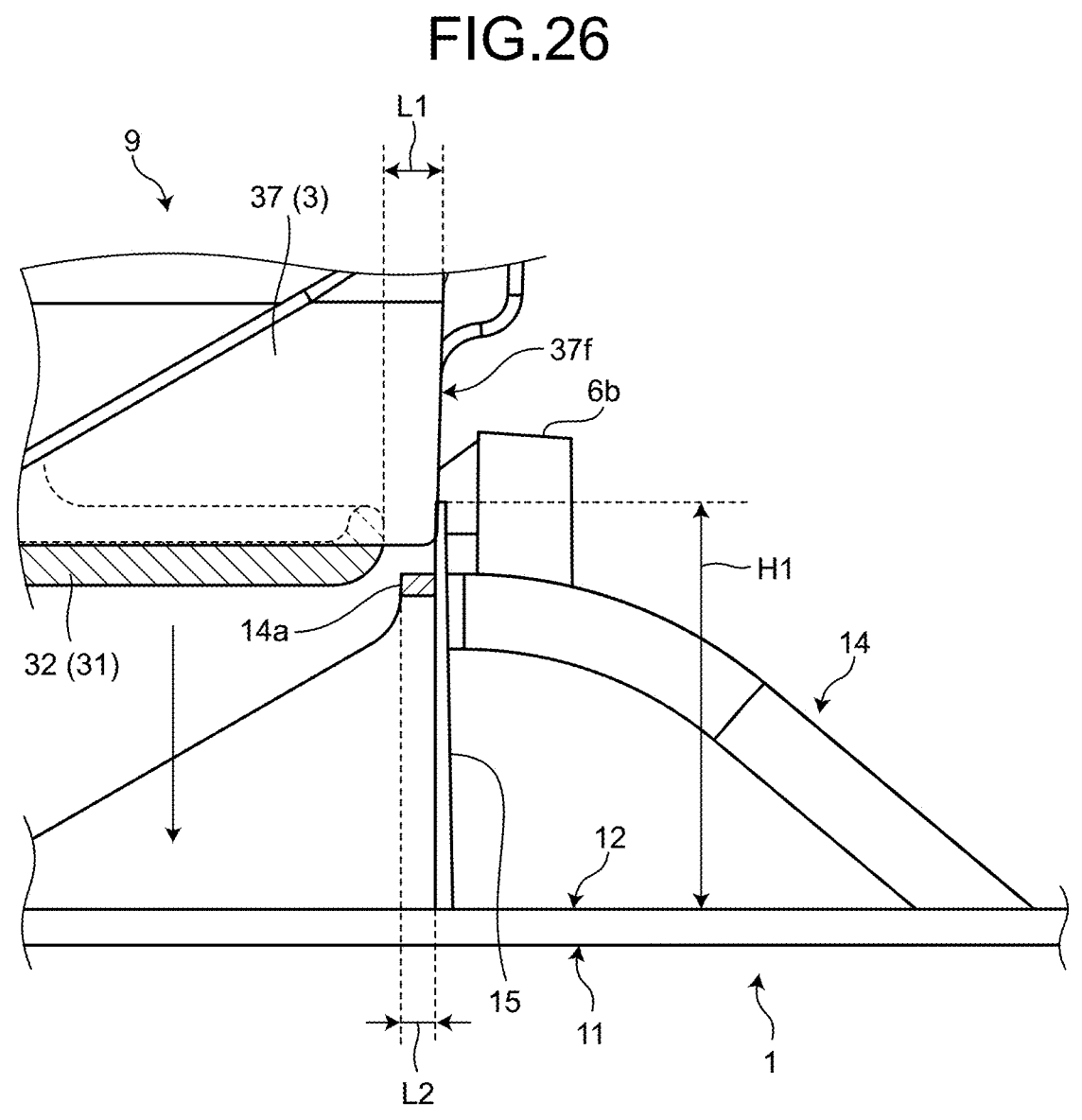

FIG. 26 is a diagram illustrating a positional relationship between the protruding portion of the outer unit and the base unit of the lock assembly at the time of joining in the embodiment of the disclosure. The joining position of the base unit 37 of the lock assembly 9 (that is, the base unit 37 of the lock mechanism 3) with respect to the protruding portion 14 of the outer unit 1 is regulated by the guide portion 15 as described above. That is, the positional relationship at the time of joining the protruding portion 14 and the base unit 37 is set on the basis of the guide portion 15.

Specifically, as illustrated in FIG. 26, the guide portion 15 is provided on the outer wall of the protruding portion 14 in such a manner that the maximum height H1 from the inner wall 12 of the outer unit 1 is larger than the top portion of the protruding portion 14. Therefore, when the base unit 37 is joined to the protruding portion 14, the end 37*f* of the base unit 37 can be easily brought into contact (sliding contact) with the guide portion 15.

Furthermore, as illustrated in FIG. 26, the knob 32 of the operation unit 31 assembled to the base unit 37 is separated inward from the end 37*f* of base unit 37. A separation distance L1 between the end 37*f* of the base unit 37 and the operation unit 31 (more specifically, an end of the knob 32) is larger than a separation distance L2 between the end 14*a* (end on the top portion side) of the protruding portion 14 and the guide portion 15. Therefore, when the base unit 37 and the protruding portion 14 are joined, as long as the end 37*f* of the base unit 37 is in contact with the guide portion 15, the knob 32 in the base unit 37 and the end 14*a* of the protruding portion 14 are separated from each other, thereby avoiding contact between the knob 32 and the protruding portion 14. Thus, the base unit 37 and the protruding portion 14 can be joined without damaging the knob 32. In addition, since the separation distance L1 between the end 37f of the base unit 37 and the end of the knob 32 can be made as small as not exceeding the separation distance L2 between the end 14a of the protruding portion 14 and the guide portion 15, the base unit 37 can be easily downsized, and as a result, the cost required for the base unit 37 can be reduced.

Figure 27A:
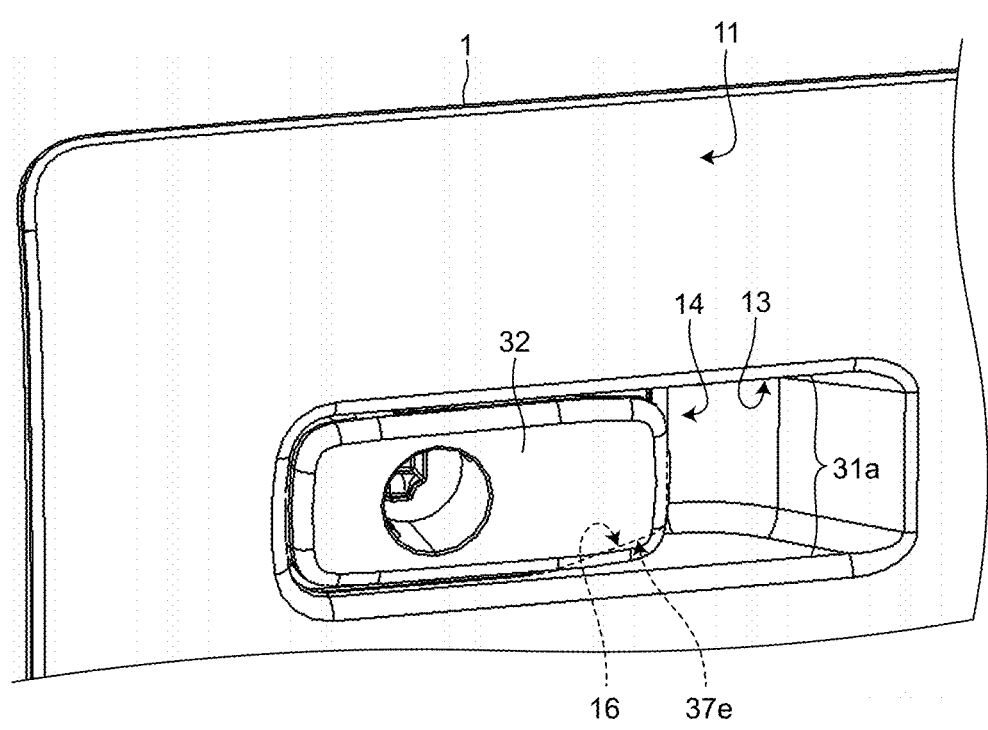
FIG. 27A is a diagram of the vicinity of an opening of the outer unit to which the lock assembly is assembled as viewed from an outer wall side.
Figure 27B:
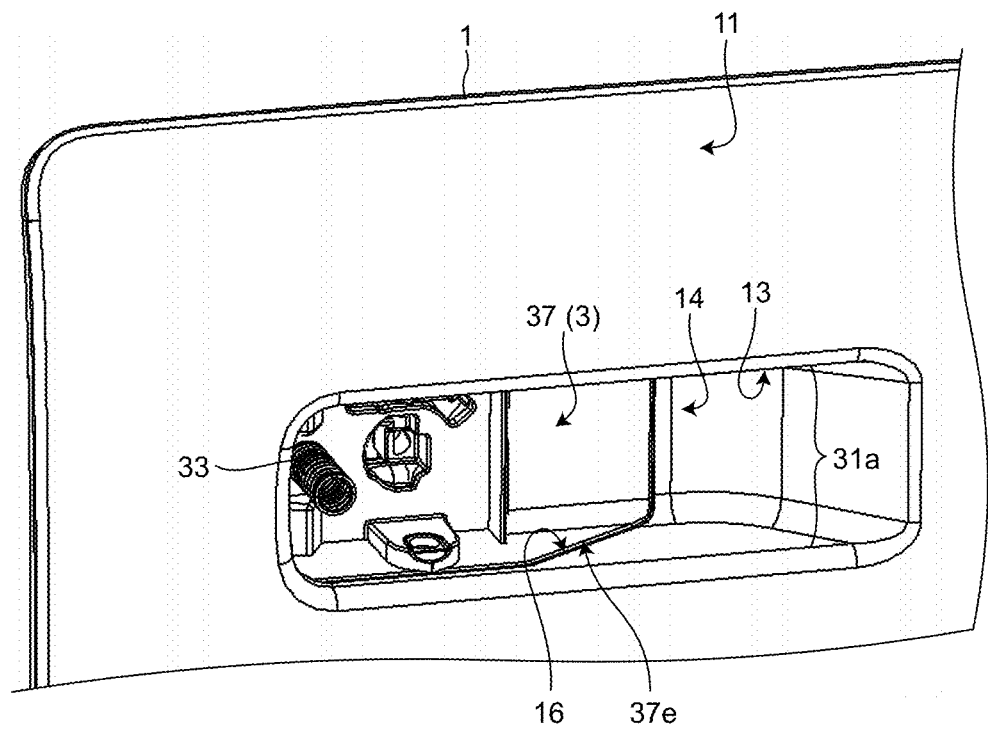
FIG. 27B is a diagram illustrating an example of a parting line between the base unit of the lock assembly and the protruding portion of the outer unit.

FIG. 27A is a diagram of the vicinity of the opening of the outer unit to which the lock assembly is assembled as viewed from the outer wall side. FIG. 27B is a diagram illustrating an example of the parting line between the base unit of the lock assembly and the protruding portion of the outer unit. Note that FIG. 27B is a diagram illustrating the appearance of the outer unit 1 illustrated in FIG. 27A from which the knob 32 is removed.

As illustrated in FIGS. 27A and 27B, in a case where the base unit 37 of the lock mechanism 3 and the protruding portion 14 of the outer unit 1 are joined, an operation space 31a is formed in the outer unit 1, and the parting line between the base unit 37 and the protruding portion 14 is formed. The operation space 31a is a space for operating (turning) the knob 32 exposed to the outer wall 11 side through the opening 13 of the outer unit 1. The operation space 31a is formed to have an appropriate depth (depth suitable for the operation of the knob 32) from the opening 13 of the outer unit 1 by allowing the internal space of the base unit 37 and the internal space of the protruding portion 14 to communicate with each other.

In addition, as illustrated in FIGS. 27A and 27B, the parting line (hereinafter, it may be abbreviated as a "parting line in the operation space 31a") between the base unit 37 and the protruding portion 14 is formed on an inner wall surface surrounding the operation space 31a. In the parting line in the operation space 31a, a parting line made by the engagement between the first engagement portion 16 of the protruding portion 14 and the second engagement portion 37e of the base unit 37 is formed on the inner wall extending from the back side of the operation space 31a to the vicinity of the opening 13 as illustrated in FIG. 27B.

Here, as described above, the first engagement portion 16 and the second engagement portion 37e are formed in an inclined shape descending from the top portion side (in FIGS. 27A and 27B, the back side of the operation space 31a) of the protruding portion 14 toward the opening 13 side. Therefore, the parting line in the operation space 31a is hidden behind the knob 32 as illustrated in FIG. 27A. As a result, since the parting line is hardly visible, the appearance of the operation space 31a is improved, which contributes to improvement of the appearance of the glove box 10.

Assembling Inner Unit to Outer Unit

Figure 28:
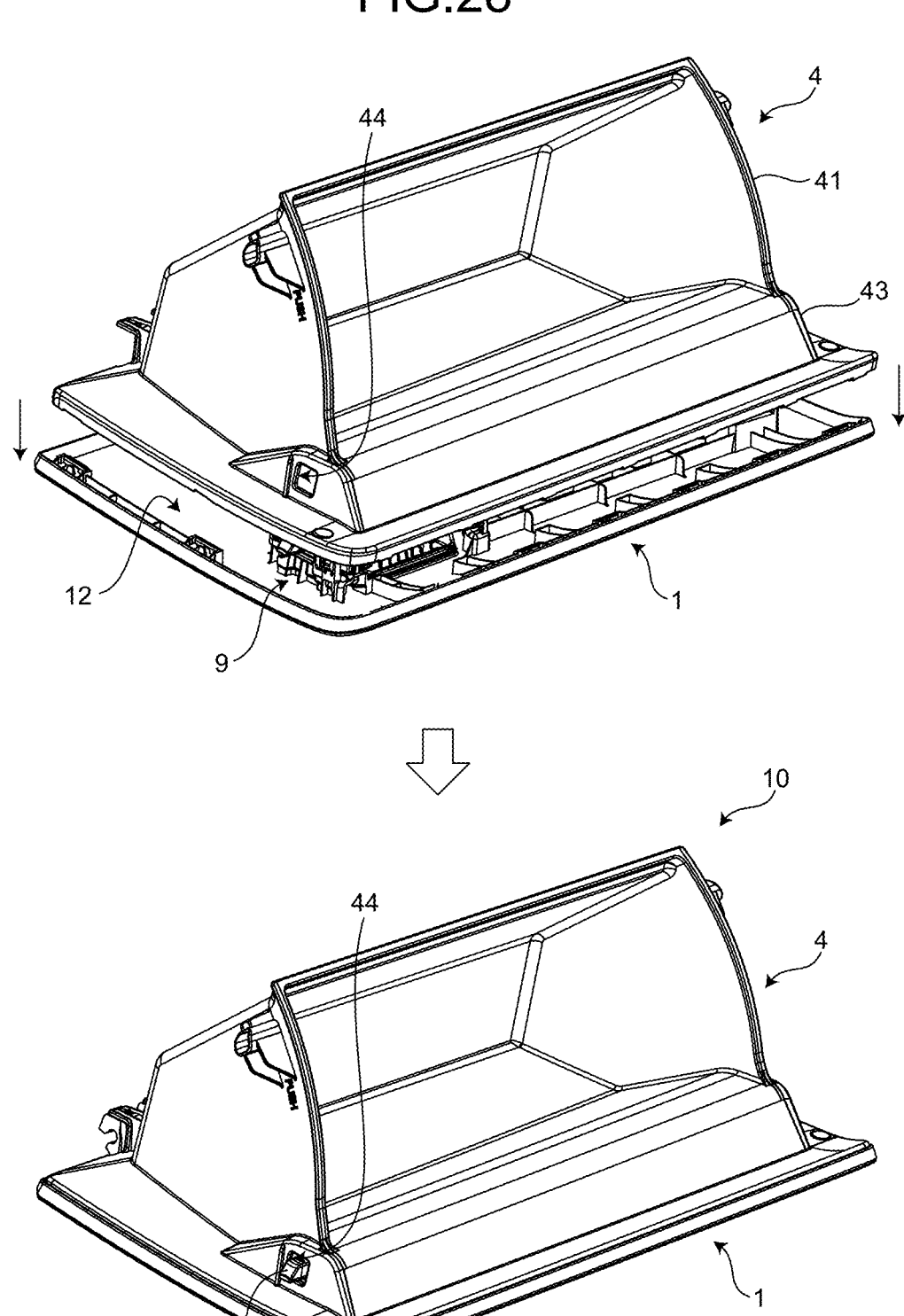
FIG. 28 is a perspective view illustrating an example of assembling an inner unit to the outer unit of the embodiment of the disclosure.
Figure 29:
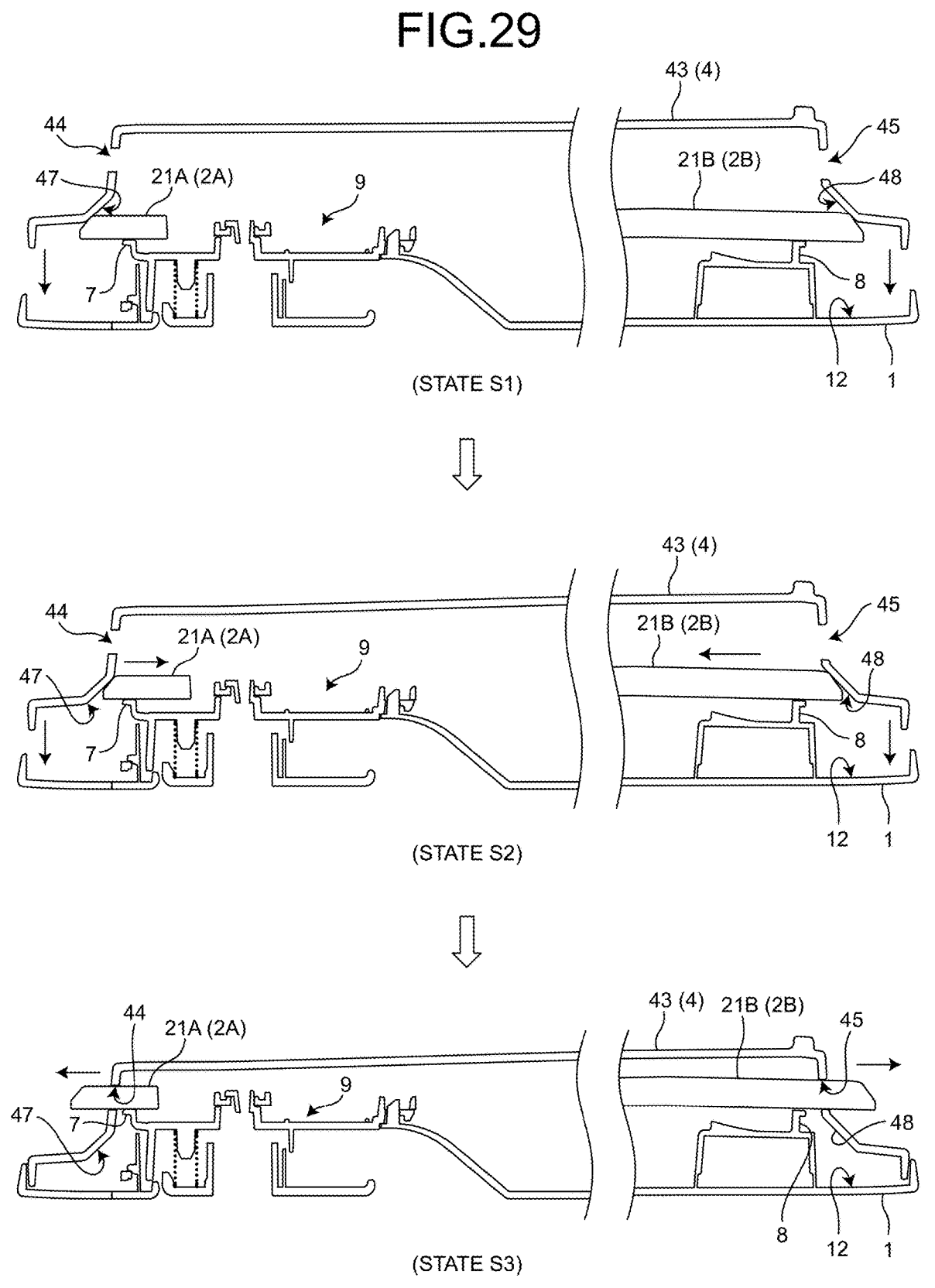

Assembling the inner unit 4 to the outer unit 1 will be described in detail. FIG. 28 is a perspective view illustrating an example of assembling the inner unit to the outer unit of the embodiment of the disclosure. FIG. 29 is a schematic cross-sectional view illustrating an example of assembling the outer unit and the inner unit illustrated in FIG. 28.

As illustrated in FIGS. 28 and 29, the above-described lock assembly 9 is assembled to the inner wall 12 of the outer unit 1, and the inner unit 4 is assembled to the outer unit 1 from the inner wall 12 side in such a manner as to enclose the lock assembly 9 inside the enclosure unit 43. At this point, the enclosure unit 43 of the inner unit 4 is pressed against the inner wall 12 of the outer unit 1, and fitting holes (for example, the fitting holes 46 illustrated in FIGS. 21 and 22) of the peripheral edge of the inner unit 4 and fitting claws (for example, the fitting claws 17 illustrated in FIG. 5) of the peripheral edge of the outer unit 1 are fitted.

In assembling the outer unit 1 and the inner unit 4, as illustrated in FIG. 29, the enclosure unit 43 allows one of the inclined portions, namely, the inclined portion 47, to be pressed against the protruding and retracting portion 21A of the first rod 2A and the other inclined portion 48 to be pressed against the protruding and retracting portion 21B of the second rod 2B (state S1). Note that the protruding and retracting portion 21A of the first rod 2A is received by one of the receiving seat portions, namely, the receiving seat portion 7, and the protruding and retracting portion 21B of the second rod 2B is received by the other receiving seat portion 8.

Subsequently, as the assembling of the outer unit 1 and the inner unit 4 proceeds, the enclosure unit 43 further approaches the outer unit 1. At this point, as illustrated in FIG. 29, the enclosure unit 43 allows the protruding and retracting portion 21A to move toward the inside of the inner unit 4 by bringing one of the inclined portions, namely, the inclined portion 47, into sliding contact with an inclined distal end surface of the protruding and retracting portion 21A. At the same time, in the enclosure unit 43 allows the protruding and retracting portion 21B to move toward the inside of the inner unit 4 by bringing the other inclined portion 48 into sliding contact with an inclined distal end surface of the protruding and retracting portion 21B (state S2).

Then, the assembling of the outer unit 1 and the inner unit 4 is completed, and the peripheral edge of the enclosure unit 43 is fitted to the peripheral edge of the outer unit 1. At this point, as illustrated in FIG. 29, the enclosure unit 43 comes into sliding contact with the protruding and retracting portion 21A from one of the inclined portions, namely, the inclined portion 47, to the protruding and retracting port 44 and allows the protruding and retracting portion 21A to protrude from the protruding and retracting port 44. At the same time, the enclosure unit 43 comes into sliding contact with the protruding and retracting portion 21B from the other inclined portion 48 to the protruding and retracting port 45 and allows the protruding and retracting portion 21B to protrude from the protruding and retracting port 45 (state S3). In this state S3, the protruding and retracting portion 21A is slidably surrounded by the protruding and retracting port 44, whereby the first rod 2A is positioned in a state of being received by the receiving seat portion 7. At the same time, the protruding and retracting portion 21B is slidably surrounded by the protruding and retracting port 45, whereby the second rod 2B is positioned in a state of being received by the receiving seat portion 8.

As described above, assembling the inner unit 4 to the outer unit 1 is completed, and the glove box 10 is obtained as illustrated in FIG. 28. The assembling direction (fitting direction) of the inner unit 4 with respect to the outer unit 1 is preferably the same linear direction as the assembling direction of the lock assembly 9 with respect to the outer unit 1.

Note that each of the work processes from assembling the lock mechanism 3 to assembling the outer unit 1 and the inner unit 4 described above may be performed in a series of production lines or may be performed separately in a plurality of production lines. For example, a series of work processes from assembling the lock mechanism 3 to assembling the lock unit 2 and the lock mechanism 3 (that is, the assembling process of the lock assembly 9) may be performed in a production line (hereinafter, referred to as a sub-production line) different from a production line of the glove box 10 (hereinafter, referred to as a main production line), and a series of work processes from assembling the lock assembly 9 and the outer unit 1 to assembling the outer unit 1 and the inner unit 4 may be performed in the main production line. In this case, the lock assembly 9 assembled in the sub-production line may be supplied to the main production line, and the glove box 10 may be assembled in the main production line in parallel with the operation of the sub-production line.

As described above, the glove box 10 of the embodiment of the disclosure includes: the outer unit 1 freely turnably provided in the vehicle compartment to open and close; the lock unit 2 that locks the closed state of the outer unit 1 in a releasable manner; the lock mechanism 3 that causes the lock unit 2 to operate; the inner unit 4 that closes the inner wall 12 of the outer unit 1 to which the lock unit 2 and the lock mechanism 3 are assembled; the fitting portions 5 and 6 that assemble the inner wall 12 of the outer unit 1 and the lock mechanism 3 to each other in the linear direction; and the receiving seat portion that receives the lock unit 2, the receiving seat portion being formed in a recessed shape opened in the linear direction, in which the lock mechanism 3 includes: the operation unit 31 for unlocking the outer unit 1; the interlocking unit 34 that interlocks the operation unit 31 and the lock unit 2; and the base unit 37 to which the operation unit 31 and the interlocking unit 34 are provided. In addition, the inner unit 4 includes a through hole into which the lock unit 2 can protrude and retract, and an inclined portion inclined to the inside of the inner unit 4 from the inner wall side of the outer unit 1 toward the through hole, and the inclined portion is brought into sliding contact with the distal end of the lock unit 2 in the longitudinal direction when the outer unit 1 and the inner unit 4 are assembled.

Therefore, the lock unit 2 can be attached to the receiving seat portion in the same linear direction as the assembling direction (fitting direction) of the outer unit 1 and the lock mechanism 3, and the lock unit 2 can be slid along the inclined portion to protrude from the through hole as the inner unit 4 is assembled to the outer unit 1. As a result, work required each time one component is assembled can be reduced to one-step work (one action) of assembling components in the linear direction, and as a result, the complexity of assembling components can be reduced, and thus the labor and time required for assembling the glove box can be greatly reduced. This further makes it possible to avoid pressure on the production capacity of the glove box, and as a result, it is possible to mass-produce the glove box while suppressing the production cost and the work time without being forced to add a production line or the like.

In the glove box 10 of the embodiment of the disclosure, the base unit 37 pivotally supports the operation unit 31 in a freely turnable manner and is formed in a recessed shape to surround the operation unit 31. The outer unit 1 includes the opening 13 that exposes the operation unit 31 to the outer wall side of the outer unit 1, the protruding portion 14 that is formed in a protruding shape on the inner wall side of the outer unit 1 along the edge of the opening 13 and is joined in such a manner as to overlap the end of the base unit 37 to form the operation space of the operation unit 31, and the guide portion 15 that is provided on the outer wall of the protruding portion 14 and separated from the end of the protruding portion 14, the guide portion 15 being in contact with the end of the base unit 37 to regulate the joining position of the base unit 37 with respect to the protruding portion 14. Meanwhile, the operation unit 31 is separated inward from the end of the base unit 37, the separation distance between the end of the base unit 37 and the operation unit 31 is larger than the separation distance between the end of the protruding portion 14 and the guide portion 15, and the maximum height of the guide portion 15 from the inner wall of the outer unit 1 is less than or equal to the maximum height of the lock mechanism 3 from the inner wall of the outer unit 1.

Therefore, when the base unit 37 and the protruding portion 14 are joined, the end of the base unit 37 can be easily guided to the joining position with the protruding portion 14 by the contact between the end of the base unit 37 and the guide portion 15, and the joining position can be regulated in such a manner that the protruding portion 14 and the operation unit 31 are separated from each other. As a result, it is possible to prevent the operation unit 31 from being damaged by the contact between the operation unit 31 and the protruding portion 14, whereby the base unit 37 and the protruding portion 14 can be joined without impairing the appearance of the operation unit 31.

In addition, in the glove box 10 of the embodiment of the disclosure, the outer unit 1 includes the first engagement portion 16 having an inclined shape descending from the top portion side of the protruding portion 14 toward the opening 13, and the base unit 37 includes the second engagement portion 37e having an inclined shape to be engaged with the first engagement portion 16 in joining with the protruding portion 14. Therefore, the parting line between the protruding portion 14 and the base unit 37 can be formed in such a manner as to be inclined from the front side (opening 13 side) to the back side (top portion side of the protruding portion 14) of the operation space of the operation unit 31 when viewed from the outer wall side of the outer unit 1. As a result, the parting line can be hidden behind the operation unit 31, and the parting line is hardly visible, and thus the appearance of the operation space is improved, which can contribute to improvement of the appearance of the glove box 10.

Furthermore, in the glove box 10 of the embodiment of the disclosure, the interlocking unit 34 has the fitting pins fitted to the lock unit 2, is pivotally supported by the base unit 37 in a freely turnable manner, and converts turning into reciprocating operation in the longitudinal direction of the lock unit 2, and the base unit 37 has the claw portion 39 that suppresses swinging of the lock unit 2 in a state of being fitted to the fitting pins. Meanwhile, the lock unit 2 includes the fitting holes which are long in a width direction perpendicular to the longitudinal direction of the lock unit 2 and into which the fitting pins are fitted and the claw hole 26B which is long in the longitudinal direction of the lock unit 2 and into which the claw portion 39 is fitted, and the claw portion 39 protrudes in a direction opposite to the direction from the turning center of the interlocking unit 34 toward the outside in the longitudinal direction of the fitting holes and overlaps the edge of the claw hole 26B.

For this reason, even when the lock unit 2 is about to swing, the claw portion 39 can be always kept overlapped with the edge of the claw hole 26B and can be engaged with the claw hole 26B against the swing of the lock unit 2. As a result, unintended swinging of the lock unit 2 can be suppressed. As a result, swinging of the lock unit 2 (specifically, the long second rod 2B) when handling the lock mechanism 3 (namely, the lock assembly 9) to which the lock unit 2 is assembled can be suppressed, and thus the lock assembly 9 can be easily handled as one part of the glove box 10, and the lock unit 2 and the lock mechanism 3 can be collectively and easily assembled to the inner wall of the outer unit 1 as the lock assembly 9. In addition, the production of the lock assembly 9 by the sub-production line and the production of the glove box 10 by the main production line can be performed in parallel, and the lock assembly 9 by the sub-production line can be supplied to the main production line as one part of the glove box 10 to perform production of the glove box 10 by the main production line. Therefore, the number of parts of the glove box 10 handled in the main production line can be reduced, and the labor and the time required for production of the glove box 10 in the main production line can be greatly reduced.

In the glove box 10 of the embodiment of the disclosure, the lock unit 2 has the receiving surface that receives a load in the turning direction of the outer unit 1, and the receiving surface is formed in an arc shape. Therefore, even when the lock unit 2 is tilted around the longitudinal direction thereof, the load can be received by the receiving surface of the lock unit 2 from a direction that is always perpendicular to the turning direction of the outer unit 1, whereby the loss of the load applied to the receiving surface of the lock unit 2 can be reduced. In addition, even when the lock unit 2 is reversed in the width direction (left-right direction) of the glove box 10, the action of the receiving surface of the lock unit 2 can be secured. Therefore, regardless of whether the glove box 10 is provided in a left-hand drive vehicle or a right-hand drive vehicle, the pair of long and short rod members included in the lock unit 2 can be used in common. As a result, it is not necessary to produce the lock unit 2 separately for the left-hand drive vehicle and the right-hand drive vehicle, and the cost required for molds of the rod members can be reduced, and thus the production cost of the glove box can be reduced.

In addition, the glove box 10 of the embodiment of the disclosure further includes the regulation pins that regulate the motion direction of the lock unit 2 accompanying the operation of the interlocking unit 34 in the longitudinal direction of the lock unit 2, and the lock unit 2 has the regulation holes that are long in the longitudinal direction of the lock unit 2 and through which the regulation pins are inserted. Therefore, the turning of the interlocking unit 34 can be appropriately converted into the reciprocating operation in the longitudinal direction of the lock unit 2.

Note that, in the embodiment described above, as the fitting portions for assembling the outer unit 1 and the lock mechanism 3, the fitting portion 5 including the fitting claw 5a of the outer unit 1 and the fitting hole 5b of the lock mechanism 3 and the fitting portion 6 including the fitting claw 6a of the lock mechanism 3 and the fitting hole 6b of the outer unit 1 (protruding portion 14) are exemplified, however, the present disclosure is not limited thereto. For example, the fitting claw 5a may be provided to the base unit 37 of the lock mechanism 3, and the fitting hole 5b may be included in the outer unit 1. Furthermore, the fitting claw 6a may be provided to the protruding portion 14 of the outer unit 1, and the fitting hole 6b may be included in the base unit 37 of the lock mechanism 3.

Moreover, in the embodiment described above, the receiving seat portion 7 having a recessed shape that receives the shorter first rod 2A of the lock unit 2 is included in the base unit 37 of the lock mechanism 3, however, the present disclosure is not limited thereto. For example, the receiving seat portion 7 may be included on the inner wall 12 of the outer unit 1.

Furthermore, in the embodiment described above, the lock unit 2 including the pair of long and short rods (the first rod 2A and the second rod 2B) has been described as an example, however, the present disclosure is not limited thereto. For example, the lock unit 2 may include a pair of rods having the same length, a single rod, or three or more rods.

In addition, in the embodiment described above, the inclined portions 47 and 48 in sliding contact with the distal ends of the lock unit 2 are included on the side walls of the inner unit 4 (the enclosure unit 43) on both sides facing each other, however, the present disclosure is not limited thereto. For example, at least one of the above-described inclined portions 47 and 48 may be included on the side walls of the inner unit 4. In this case, the side walls of the inner unit 4 preferably include an inclined portion at least on a side of a rod having a larger protruding amount from a through hole (protruding and retracting port) of the inner unit 4 out of the first rod 2A and the second rod 2B. Furthermore, the inclined portions 47 and 48 may be formed in a planar shape as illustrated in FIG. 23, for example, or may be formed in an arc shape (R shape).

In addition, in the above-described embodiment, the rods having a bent shape via the connecting portion have been described as an example as the pair of rods included in the lock unit 2, however, the present disclosure is not limited thereto. For example, the pair of rods may have linear shape without being bent.

In addition, the present disclosure is not limited by the above-described embodiments, and embodiments obtained by appropriately combining the above components are also included in the present disclosure. Other embodiments, examples, operation technology, and others implemented by those skilled in the art on the basis of the above-described embodiments are also all included in the scope of the disclosure.

According to the present disclosure, it is possible to reduce time and effort required for assembling a glove box.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A glove box comprising:

an outer unit that is freely turnably provided in a vehicle compartment and turns to open and to close;

a lock unit that locks a closed state of the outer unit in a releasable manner, the lock unit having a rod shape;

a lock mechanism that includes an operation unit that unlocks the closed state of the outer unit, an interlocking unit that interlocks the operation unit and the lock unit, and a base unit to which the operation unit and the interlocking unit are provided;

an inner unit that closes an inner wall of the outer unit to which the lock unit and the lock mechanism are assembled, the inner unit having a through hole through which the lock unit can protrude and retract;

a fitting portion that assembles the inner wall of the outer unit and the lock mechanism to each other in a linear direction; and a receiving seat portion that receives the lock unit, the receiving seat portion being formed in a recessed shape opened in the linear direction, wherein the inner unit has an inclined portion inclined to an inside of the inner unit from the inner wall side of the outer unit toward the through hole, and the inclined portion is in sliding contact with a distal end of the lock unit in a longitudinal direction when the outer unit and the inner unit are assembled.

2. The glove box according to claim 1, wherein the base unit is formed in a recessed shape pivotally supporting and surrounding the operation unit in a freely turnable manner, the outer unit includes:

an opening that exposes the operation unit to an outer wall side of the outer unit;

a protruding portion formed in a protruding shape on the inner wall side of the outer unit along an edge of the opening, the protruding portion being joined in such a manner as to overlap an end of the base unit to form an operation space of the operation unit; and a guide portion provided on an outer wall of the protruding portion, the guide portion being separated from an end of the protruding portion, the guide portion being in contact with an end of the base unit to regulate a joining position of the base unit with respect to the protruding portion, the operation unit is separated inward from the end of the base unit, a separation distance between the end of the base unit and the operation unit is larger than a separation distance between the end of the protruding portion and the guide portion, and a maximum height of the guide portion from the inner wall of the outer unit is less than or equal to a maximum height of the lock mechanism from the inner wall of the outer unit.

3. The glove box according to claim 2, wherein the outer unit has a first engagement portion having an inclined shape descending from a top portion side of the protruding portion toward the opening, and the base unit has a second engagement portion having an inclined shape that engages with the first engagement portion when joined with the protruding portion.

4. The glove box according to claim 1, wherein the interlocking unit includes a fitting pin to be fitted to the lock unit, the interlocking unit pivotally supported by the base unit in a freely turnable manner to convert turning into reciprocating operation in the longitudinal direction of the lock unit, the base unit includes a claw portion that suppresses swinging of the lock unit in a state of being fitted to the fitting pin, the lock unit includes:

a fitting hole that is long in a width direction perpendicular to the longitudinal direction of the lock unit, and into which the fitting pin is fitted; and a claw hole that is a long in the longitudinal direction of the lock unit, and into which the claw portion is fitted, and the claw portion protrudes in a direction opposite to a direction from a turning center of the interlocking unit toward an outside in a longitudinal direction of the fitting hole and overlaps an edge of the claw hole.

5. The glove box according to claim 1, wherein the lock unit has a receiving surface that receives a load in a turning direction of the outer unit, and the receiving surface is formed in an arc shape.

6. The glove box according to claim 1, further comprising:

a regulation pin that regulates a motion direction of the lock unit accompanied by motion of the interlocking unit to the longitudinal direction of the lock unit, wherein the lock unit has a regulation hole that is long in the longitudinal direction of the lock unit and through which the regulation pin is inserted.

* * * * *